US012781000B1

(12) United States Patent
Awoyera

(10) Patent No.: US 12,781,000 B1
(45) Date of Patent: Nov. 3, 2026

(54) METHOD OF PRODUCING A FIBER-REINFORCED POLYMER COMPOSITE

(71) Applicant: PRINCE MOHAMMAD BIN FAHD UNIVERSITY, Dhahran (SA)

(72) Inventor: Paul Oluwaseun Awoyera, Dhahran (SA)

(73) Assignee: PRINCE MOHAMMAD BIN FAHD UNIVERSITY, Dhahran (SA)

( * ) Notice: Subject to any disclaimer, the term of this patent is extended or adjusted under 35 U.S.C. 154(b) by 0 days.

(21) Appl. No.: 19/574,243

(22) Filed: Mar. 20, 2026

(51) Int. Cl.
*C08J 5/06* (2006.01)

(52) U.S. Cl.
CPC ............ *C08J 5/06* (2013.01); *C08J 2497/02* (2013.01)

(58) Field of Classification Search
CPC ................................ C08J 5/06; C08J 2497/02
USPC .......................................................... 523/206
See application file for complete search history.

(56) References Cited

U.S. PATENT DOCUMENTS

2023/0093348 A1* 3/2023 Imai ........................ C08B 15/00 523/206
2025/0326915 A1 10/2025 Douglas et al.

FOREIGN PATENT DOCUMENTS

CN 120716247 A 9/2025
WO WO 2011/063799 A1 6/2011
WO WO 2024/110574 A1 5/2024

OTHER PUBLICATIONS

Zsuzsanna Maria Mucsi, et al., "Fabrication and characterization of lignocellulosic coconut and energy reed straw-reinforced methylene diphenyl diisocyanate-bonded sustainable insulation panels", Construction and Building Materials, vol. 414, Jan. 16, 2024, 134992, 13 pages.
Jiaxin Chen, et al., "Flexural behaviour of flax FRP double tube confined coconut fibre reinforced concrete beams with interlocking interface", Composite Structures, vol. 192, Feb. 21, 2018, pp. 217-224, Excerpts only (8 pages) and Accepted Manuscript (22 pages).
Suryani Salim, et al., "Enhanced mechanical properties of natural fiber bamboo/ pineapple leaf/ coconut husk reinforced composites for application in bio-board", International Journal of GEOMATE, vol. 19, Issue 75, Nov. 2020, pp. 168-174.

* cited by examiner

*Primary Examiner* — Robert S Jones, Jr.
*Assistant Examiner* — Elizabeth Amato
(74) *Attorney, Agent, or Firm* — Oblon, McClelland, Maier & Neustadt, L.L.P.

(57) ABSTRACT

A method of producing a fiber-reinforced polymer composite includes mixing natural fibers, including bamboo and coconut fibers, with a polymer resin at a fiber-to-polymer resin mass ratio of from 2:1 to 5:1, based on the total weight of the polymer resin, to form a fiber-polymer resin mixture. The method further includes curing the fiber-polymer resin mixture to form the fiber-reinforced polymer composite. The polymer resin includes at least one of a thermosetting resin, a thermoplastic polymer, and a bio-based thermosetting polymer. The fiber-polymer resin mixture is cured at a temperature between 40 and 120° C. and at a pressure of 0.2 to 1.5 MPa.

20 Claims, 11 Drawing Sheets

METHOD OF PRODUCING A FIBER-REINFORCED POLYMER COMPOSITE

BACKGROUND

Technical Field

The present disclosure is directed towards a method of producing a fiber-reinforced polymer composite, and more particularly, a composite incorporating natural fibers.

Description of Related Art

The "background" description provided herein is for the purpose of presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Fiber-reinforced polymer composites have been widely explored for strengthening and rehabilitation of structural elements due to their favorable strength-to-weight ratio, corrosion resistance, and ease of installation. Conventional systems predominantly use synthetic fibers and petroleum-based polymer matrices, which, despite their mechanical efficiency, raise concerns about environmental impact, cost, and long-term sustainability. In response, natural fiber-reinforced polymer composites have been investigated as alternatives; however, many existing formulations rely on a single type of natural fiber and a limited selection of polymer matrices, resulting in trade-offs between initial mechanical strength, durability, and resistance to environmental exposure.

Further, prior natural fiber composite systems often fail to adequately balance short-term load-bearing performance with long-term stability. Fibers with high stiffness and strength may exhibit rapid degradation under moisture, chemical, or thermal exposure, while more durable fibers may lack sufficient initial mechanical capacity. In addition, the range of compatible polymer matrices and fabrication configurations in existing approaches is often restricted, limiting adaptability to diverse retrofitting scenarios. As a result, there remains a need for fiber-reinforced polymer composite systems that can integrate multiple natural fiber types within a single matrix, accommodate different resin systems, and be fabricated in versatile geometries suitable for structural retrofitting and rehabilitation applications.

Accordingly, it is one object of the present invention to provide an efficient and durable fiber-reinforced polymer composite comprising natural fibers, such as bamboo and coconut fibers. The composite exhibits enhanced mechanical strength, improved fiber-matrix interfacial integrity, and long-term durability under mechanical loading and in aggressive environmental conditions, making it suitable for structural strengthening and retrofitting applications.

SUMMARY

In an exemplary embodiment, a method of producing a fiber-reinforced polymer composite is described. The method includes mixing natural fibers, including bamboo fibers and coconut fibers, with a polymer resin at a fiber-to-polymer resin mass ratio of from 2:1 to 5:1, based on the total weight of the polymer resin, to form a fiber-polymer resin mixture. The method further includes curing the fiber-polymer resin mixture to form the fiber-reinforced polymer composite. Before the mixing, the natural fibers are treated with one or more selected from the group consisting of sodium hydroxide, an enzyme selected from the group consisting of cellulase, hemicellulose, and ligninase, a biological agent selected from the group consisting of a fungal agent and a bacterial agent, a silane coupling agent and a biopolymer-derived hydrophobic coating selected from the group consisting of a cutin-derived coating, a lipid-derived biopolymer coating, and a wax-ester biopolymer film. The polymer resin includes at least one of a thermosetting resin, a thermoplastic polymer, and a bio-based thermosetting polymer. The fiber-polymer resin mixture is cured at a temperature between 40 and 120° C. and at a pressure of 0.2 to 1.5 MPa.

In some embodiments, the fiber-polymer resin mixture includes a layered architecture of the bamboo fibers and the coconut fibers in a mass ratio between about 30:70 and about 70:30.

The layered architecture includes a cross-ply configuration having fiber layers oriented at 0° and 90°. Each fiber layer has an areal density between about 200 and 1200 g/m$^2$, a ply thickness between about 0.2 and 1.5 mm, a fiber packing density between about 0.35 and about 0.65 g/cm$^3$, and a layer-to-layer misalignment not greater than about 5°.

In some embodiments, the natural fibers are treated with the fungal agent selected from the group consisting of *Trichoderma reesei, Phanerochaete chrysosporium*, and *Aspergillus niger*. The fungal agent is applied at a culture concentration between $10^4$ and $10^8$ CFU/mL for about 10 to 100 hours at a temperature between 25° C. and 40° C. The natural fibers treated with the fungal agent exhibit a lignin reduction between about 10 and 25 wt. % and a surface roughness increase between about 10% and 60%, relative to the natural fibers without a surface treatment.

In some embodiments, the natural fibers are treated with the bacterial agent selected from the group consisting of *Enterobacter sichuanensis, Rhodococcus* species, *Pseudomonas putida, Cellulomonas* species, and *Bacillus* species. The bacterial agent is applied via incubation between about $10^5$ and $10^8$ CFU/mL for about 12 to 72 hours at a temperature between about 20° C. and 35° C. The natural fibers treated with the bacterial agent exhibit a surface oxygen-to-carbon atomic ratio of the natural fibers between about 0.35 and 0.65, a hemicellulose reduction between about 3 and 20 wt. % relative to the natural fibers without the surface treatment and an increase in surface functional groups comprising hydroxyl, carboxyl, and carbonyl groups between about 5% and about 40% relative to relative to the natural fibers without the surface treatment.

In some embodiments, the natural fibers are treated with the silane coupling agent selected from the group consisting of 3-aminopropyltriethoxysilane (APS), 3-glycidyloxypropyltrimethoxysilane (GPTMS), vinyltrimethoxysilane (VTMS), and methyltrimethoxysilane (MTMS). The silane coupling agent is applied to the natural fibers at a concentration between about 0.5 and 3 wt. % relative to the total weight of the natural fibers, at a temperature between about 60° C. and 100° C. for about 15 to 120 minutes. The natural fibers treated with the silane coupling agent exhibit an increase in surface silicon content between about 0.5 and 5 wt. % relative to the total weight of the natural fibers without the surface treatment, and a reduction in interfacial void content between about 5% and 40% relative to the natural fibers without the surface treatment.

In some embodiments, the natural fibers are treated with enzymes, resulting in a reduction in surface pectin content between about 5 and 30 wt. % relative to the natural fibers without the surface treatment and an increase in fibrillation exposure between about 10% and 50% relative to the natural fibers without the surface treatment. The enzyme is contacted with the natural fibers in a solution having an enzyme activity between about 10 and 200 U/mL at a pH between about 4.5 and 6.5 for a duration between about 1 and 24 hours, and at a temperature between about 30° C. and 55° C.

In some embodiments, the polymer resin is the thermoplastic polymer selected from the group consisting of polypropylene (PP), polyethylene (PE), polyamide (PA6), polylactic acid (PLA), polybutylene succinate (PBS), and polyethylene terephthalate (PET).

In some embodiments, the polymer resin is the thermosetting resin selected from the group consisting of an epoxy resin, an unsaturated polyester resin, a phenolic resin, a polyurethane resin, a vinyl ester resin, and a melamine-formaldehyde resin. During curing, the thermosetting resin forms a crosslinked polymer network with a crosslink density between about $2\times10^{-4}$ and $1\times10^{-3}$ mol/cm$^3$.

In some embodiments, the polymer resin is a bio-based thermosetting polymer selected from the group consisting of itaconic acid-based polyesters, mycelium-reinforced epoxy hybrids, polyhydroxyalkanoate-modified thermosets, soy-based epoxies, cardanol-based phenolic resins, and furfuryl alcohol-derived furan resins. The bio-based thermosetting polymer exhibits a crosslink density between about $1\times10^{-4}$ and $8\times10^{-4}$ mol/cm$^3$.

In some embodiments, the natural fibers include the bamboo fibers and the coconut fibers in a mass ratio between 30:70 and 70:30, based on the total weight of the natural fibers. The natural fibers have a tensile strength-to-impact energy absorption ratio between about 1.8 and 3.5, a fiber packing efficiency between about 0.35 and 0.65 g/cm3, and a hybrid synergy index between about 1.1 and 1.4.

In some embodiments, the fiber-reinforced polymer composite has a tensile strength between about 180 and 280 MPa, as measured in accordance with ASTM D3039, and a flexural strength between about 220 and 320 MPa, as measured in accordance with ASTM D790.

In some embodiments, the fiber-reinforced polymer composite has a tensile modulus between about 10 and 22 GPa, as measured in accordance with ASTM D3039, and a flexural modulus between about 8 and 18 GPa, as measured in accordance with ASTM D790.

In some embodiments, the fiber-reinforced polymer composite has an interlaminar shear strength between about 12 and 28 MPa as measured in accordance with ASTM D2344 and an interlaminar fracture toughness between about 400 and 1000 J/m$^2$ as measured in accordance with ASTM D5528.

In some embodiments, the fiber-reinforced polymer composite has between about 75% and 90% of the tensile strength after 500 hours in about 3 to 5 wt. % NaCl, between about 75% and 90% of the flexural strength after 500 hours at a pH of about 3 to 12; and between about 75% and 85% of the tensile and flexural strengths after immersion for 28 days in an aqueous solution selected from the group consisting of 5 wt. % hydrochloric acid, 5 wt. % sodium hydroxide, and 5 wt. % sodium chloride, as measured in accordance with ASTM D570.

In some embodiments, the fiber-reinforced polymer composite has a 24-hour water absorption not greater than about 3 wt % and a 7-day water absorption not greater than about 6 wt %.

In some embodiments, the fiber-reinforced polymer composite has a swelling thickness between about 0.5% and 1.0% after 24 hours of water immersion, the swelling thickness between about 1.0% and 1.5% at a full-saturation water uptake, and the swelling thickness not greater than about 4% after 7 days of water immersion.

In some embodiments, the fiber-reinforced polymer composite has a glass transition temperature between about 80° C. and 180° C. and a thermal degradation onset temperature of at least about 280° C.

In some embodiments, the fiber-reinforced polymer composite has a storage modulus between about 2 and 6 GPa at 25° C. as measured in accordance with ASTM D4065 and the storage modulus of about 0.8 to 3.0 GPa at a temperature between about 75° C. and 100° C. as measured in accordance with ASTM D7028.

In some embodiments, the fiber-reinforced polymer composite has a fatigue life of at least about $10^5$ cycles at a stress amplitude of 40% to 50% of the tensile strength between about 180 and 280 MPa and an impact strength between about 35 and 80 kJ/m$^2$ as measured in accordance with ASTM D256.

In some embodiments, the fiber-reinforced polymer composite has a limiting oxygen index of at least about 26% as measured in accordance with ASTM D2863, and a thermal conductivity between about 0.08 and 0.18 W/(mK) as measured in accordance with ASTM E1530.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
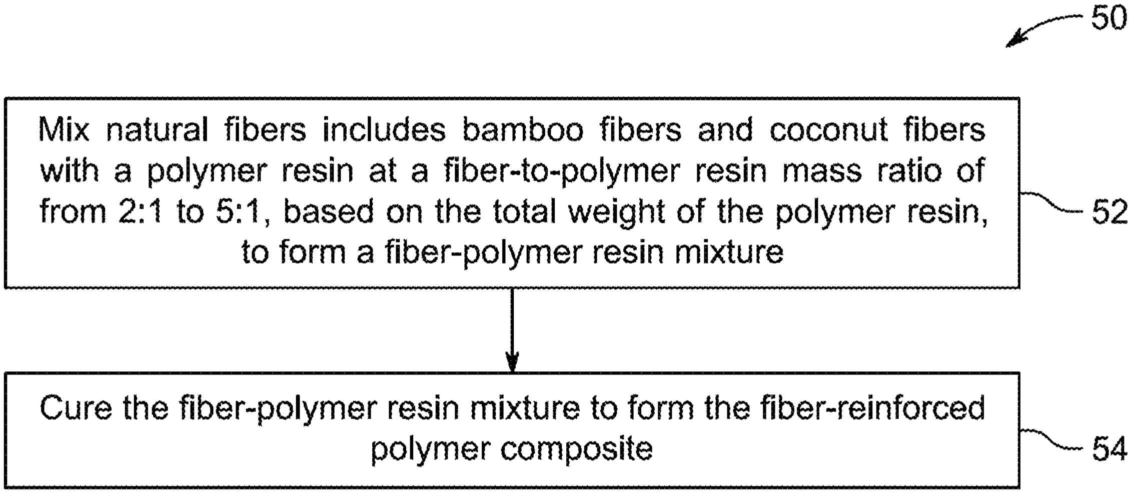
FIG. 1 is an exemplary flowchart of a method of producing a fiber-reinforced polymer composite, according to certain embodiments.
Figure 2:
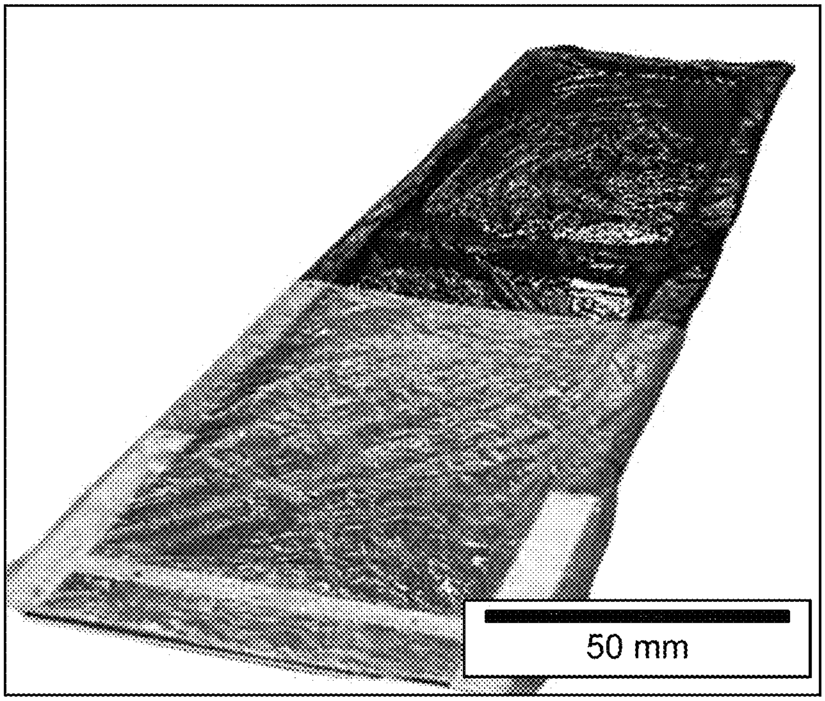
FIG. 2 is a photograph showing fiber-reinforced polymer (FRP) laminate during resin impregnation and curing on a flat mold surface, illustrating layered composite formation at a scale bar of 50 mm, according to certain embodiments.
Figure 3:
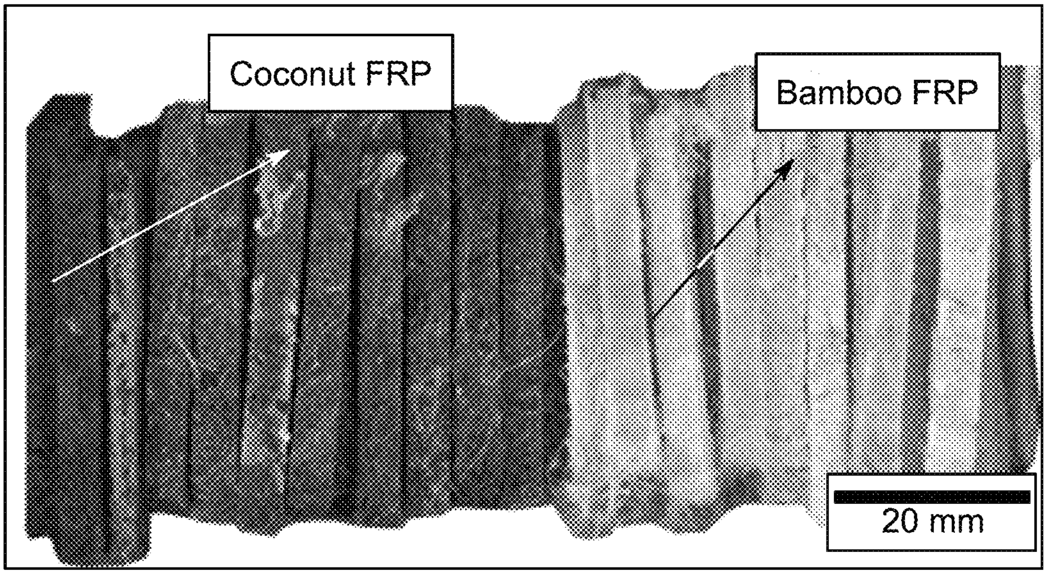
FIG. 3 is a photograph showing FRP laminates, including coconut fiber FRP and bamboo fiber FRP, at a scale bar of 20 mm, according to certain embodiments.
Figure 4:
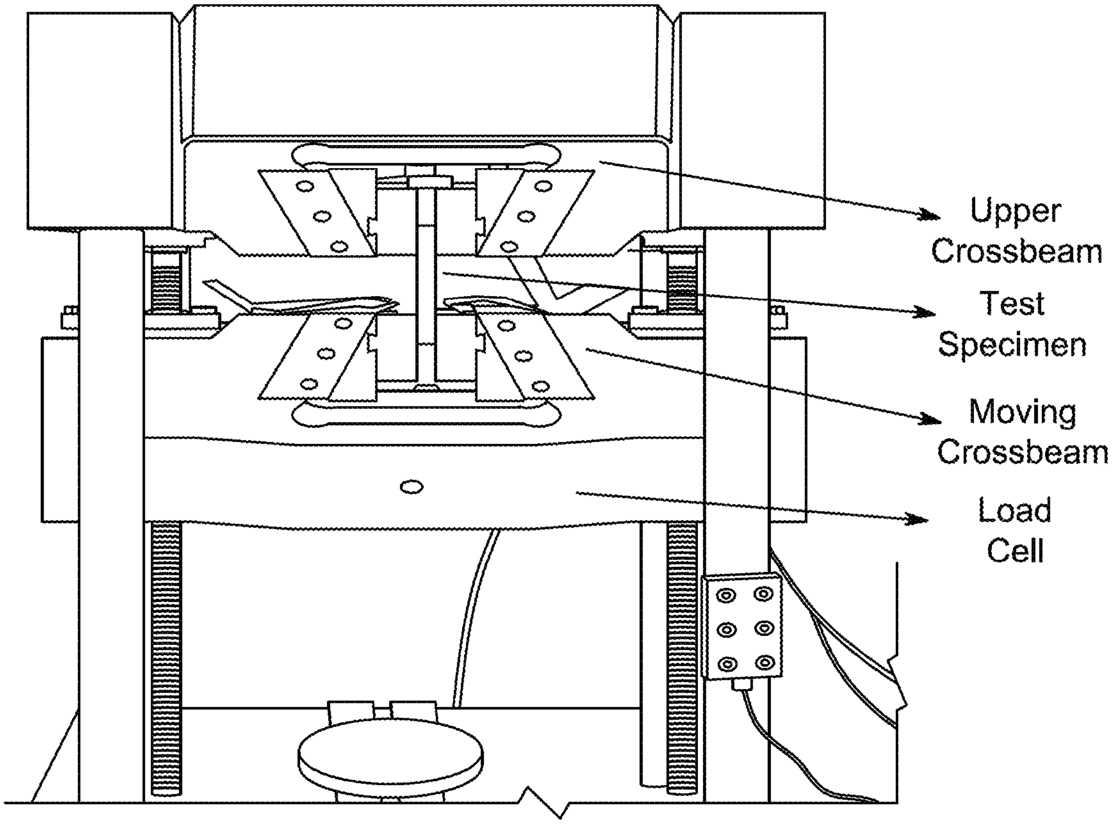
FIG. 4 is a testing machine setup used for mechanical testing of a composite, according to certain embodiments.

When describing the present disclosure, the terms used are to be construed in accordance with the following definitions, unless context dictates otherwise.

Embodiments of the present invention will now be described more fully hereinafter with reference to the accompanying drawings wherever applicable, in that some, but not all, embodiments of the disclosure are shown.

In the drawings, like reference numerals designate identical or corresponding parts throughout several views. Further, as used herein, the words 'a,' 'an' and the like carry a meaning of 'one or more,' unless stated otherwise.

Furthermore, the terms 'approximately,' 'approximate,' 'about,' and similar terms refer to ranges that include the identified value within a margin of 20%, 10%, or preferably 5%, and any values therebetween.

As used herein, the term 'room temperature' refers to a temperature range of '25 degrees Celsius (° C.)±3° C. in the present disclosure.

As used herein, the term 'fiber-reinforced polymer' refers to a composite material comprising one or more fibers embedded within a polymeric matrix to improve mechanical, thermal, or durability properties.

As used herein, the term 'natural fibers' refers to fibers derived from plant, animal, or mineral sources and used as reinforcement in composite materials.

As used herein, the term 'polymer resin' refers to a polymeric matrix material that binds and encapsulates reinforcing fibers in a composite structure.

As used herein, the term 'thermoplastic polymer' refers to a polymer that softens upon heating and hardens upon cooling in a reversible manner.

As used herein, the term 'thermosetting resin' refers to a polymer that irreversibly cures into a rigid network upon heating or chemical reaction.

As used herein, the term 'bio-based thermosetting polymer' refers to a thermosetting resin derived partially or wholly from renewable biological resources.

As used herein, the term 'crosslink density' refers to the number of crosslinks per unit volume within a polymer network.

As used herein, the term 'enzyme' refers to a biological catalyst capable of modifying fiber constituents or surface chemistry.

As used herein, the term 'biological agent' refers to a biologically derived material or organism used to alter, treat, or process fibers or composites.

As used herein, the term 'biopolymer-derived hydrophobic coating' refers to a surface layer formed from biopolymer sources that imparts water-repellent characteristics.

As used herein, the term 'areal density' refers to the mass of fibers or fabric per unit area.

As used herein, the term 'fiber packing density' refers to the proportion of fiber volume relative to the total composite volume.

As used herein, the term 'layer-to-layer misalignment' refers to angular or positional deviation between adjacent composite layers.

As used herein, the term 'lignin reduction' refers to the decrease in lignin content within natural fibers through chemical or biological treatment.

As used herein, the term 'surface roughness' refers to the degree of texture or irregularity present on a fiber or composite surface.

As used herein, the term 'hemicellulose reduction' refers to the partial or complete removal of hemicellulose from natural fibers.

As used herein, the term 'interfacial void content' refers to the volume fraction of voids present at the fiber-matrix interface.

As used herein, the term 'surface pectin content' refers to the amount of pectin remaining on the outer surface of natural fibers.

As used herein, the term 'tensile strength' refers to the maximum stress a material can withstand under uniaxial tension.

As used herein, the term 'fiber packing' refers to the spatial arrangement and distribution of fibers within a composite matrix.

As used herein, the term 'hybrid-synergy index' refers to a quantitative measure of performance enhancement arising from the combined use of different fiber types.

As used herein, the term 'flexural strength' refers to the maximum stress sustained by a material under bending loads.

As used herein, the term 'tensile modulus' refers to the ratio of tensile stress to tensile strain within the elastic region.

As used herein, the term 'flexural modulus' refers to the stiffness of a material as determined from bending deformation.

As used herein, the term 'interlaminar shear strength' refers to the maximum shear stress sustained between adjacent composite layers.

As used herein, the term 'interlaminar fracture toughness' refers to the resistance of a laminated composite to crack propagation between layers.

As used herein, the term 'thermal-degradation onset temperature' refers to the temperature at which significant thermal decomposition begins.

As used herein, the term 'glass transition temperature' refers to the temperature at which a polymer transitions from a glassy state to a rubbery state.

As used herein, the term 'storage modulus' refers to the elastic component of a material's viscoelastic response.

As used herein, the term 'stress amplitude' refers to the magnitude of cyclic stress applied during fatigue or dynamic loading.

As used herein, the term 'impact strength' refers to the ability of a material to absorb energy during sudden loading without failure.

As used herein, the term 'limiting oxygen index' refers to the minimum concentration of oxygen required to sustain combustion of a material.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include hydration states of a given compound or formula, unless otherwise noted or when heating a material.

In addition, the present disclosure is intended to include isotopes of the atoms present in the compounds and complexes described herein. Isotopes are atoms with the same atomic number but different mass numbers.

Aspects of the present disclosure relate to bamboo fiber- and coconut fiber-reinforced polymer composites for sustainable structural retrofitting, wherein environmentally resilient natural fiber-reinforced polymer laminates are engineered to provide enhanced mechanical strength and durability while maintaining ecological sustainability under aggressive service conditions.

FIG. 1A illustrates a schematic flow chart of a method 50 of producing a fiber-reinforced polymer composite. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes mixing natural fibers, including bamboo and coconut fibers, with a polymer resin at a fiber-to-polymer resin mass ratio of from 2:1 to 5:1, based on the total weight of the polymer resin, to form a fiber-polymer resin mixture.

In some embodiments, natural fibers may include but are not limited to cotton fibers, jute fibers, flax fibers, hemp fibers, kenaf fibers, sisal fibers, abaca fibers, ramie fibers, coir pith fibers, pineapple leaf fibers, banana fibers, oil palm fibers, sugarcane bagasse fibers, wheat straw fibers, rice husk fibers, rice straw fibers, barley straw fibers, oat straw fibers, corn husk fibers, corn stalk fibers, wood pulp fibers, softwood fibers, hardwood fibers, eucalyptus fibers, kapok fibers, milkweed fibers, wool fibers, silk fibers, alpaca fibers, and cashmere fibers. In a preferred embodiment, natural fibers include bamboo fibers and coconut fibers.

In certain embodiments, the fiber-to-polymer resin mass ratio is selected to balance fiber reinforcement efficiency, resin wet-out, and composite consolidation. A mass ratio between about 2:1 and 5:1 may be used to attain high fiber volume fractions while maintaining sufficient resin content to fully encapsulate the fibers and minimize void formation.

In some embodiments, the fiber-to-polymer mass ratio may be determined by weighing oven-dried fibers and polymer resin prior to mixing. The ratio may be calculated as the mass of the dried fibers divided by the mass of the polymer resin, excluding volatiles, solvents, or additives. The mass ratio may be adjusted based on fiber type, fiber packing density, resin viscosity, and desired laminate thickness.

In certain embodiments, higher fiber-to-polymer ratios (e.g., 4:1 to 5:1) may be used to produce lightweight, high-stiffness laminates suitable for structural retrofitting applications. Lower ratios (e.g., 2:1 to 3:1) may be used to improve resin infiltration into dense fiber bundles or to enhance toughness and impact resistance.

In some embodiments, the fiber-to-polymer ratio may be optimized for hybrid fiber systems. For example, bamboo fibers may require higher resin content to ensure adequate wet-out due to their higher stiffness and lower surface porosity, whereas coconut fibers may require lower resin content due to their higher lignin content and natural hydrophobicity. The ratio may therefore be adjusted to attain uniform resin distribution across mixed fiber architectures.

In certain embodiments, the fiber-to-polymer ratio may be controlled during manufacturing using pre-pregging, resin infusion, or compression molding techniques. Real-time monitoring of resin uptake, fiber compaction, or laminate thickness may be used to ensure that the final composite attains the desired mass ratio and mechanical performance.

In some embodiments, the fiber-to-polymer resin mass ratio ranges from 2:1 to 5:1, preferably 2.2:1 to 5:1, preferably 2.4:1 to 5:1, preferably 2.6:1 to 5:1, preferably 2.8:1 to 5:1, preferably 3:1 to 5:1, preferably 3.2:1 to 5:1, preferably 3.4:1 to 5:1, preferably 3.6:1 to 5:1, preferably 3.8:1 to 5:1, preferably 4:1 to 5:1, preferably 4.2:1 to 5:1, preferably 4.4:1 to 5:1, preferably 4.6:1 to 5:1, preferably 4.8:1 to 5:1.

In some embodiments, the polymer resin may include but is not limited to elastomeric polyurethane resin, styrene-butadiene rubber resin, nitrile rubber resin, butyl rubber resin, ethylene-propylene-diene monomer resin, chloroprene rubber resin, silicone rubber resin, fluorosilicone rubber resin, polyisoprene resin, polybutadiene resin, thermoplastic elastomer resin, styrenic block copolymer resin, olefinic elastomer resin, polyester elastomer resin, polyether elastomer resin, ionomer resin, ethylene-vinyl acetate elastomer resin, acrylic elastomer resin, hydrogenated nitrile rubber resin, fluorocarbon elastomer resin, polysulfide rubber resin, epichlorohydrin rubber resin, polyacrylate rubber resin, chlorinated polyethylene resin, ethylene-propylene rubber resin, styrene-isoprene-styrene resin, styrene-butadiene-styrene resin, polyolefin elastomer resin, thermoplastic vulcanizate resin, and polyamide elastomer resin. In a preferred embodiment, the polymer resin includes at least one of a thermosetting resin, a thermoplastic polymer, and a bio-based thermosetting polymer.

In some embodiments, thermosetting resin may include but is not limited to epoxy resin, phenolic resin, urea-formaldehyde resin, melamine-formaldehyde resin, polyester resin, vinyl ester resin, polyurethane thermoset resin, bismaleimide resin, cyanate ester resin, benzoxazine resin, furan resin, alkyd resin, diallyl phthalate resin, silicone thermoset resin, phenol-resorcinol-formaldehyde resin, phenol-formaldehyde novolac resin, phenol-formaldehyde resol resin, polyimide thermoset resin, unsaturated polyester resin, and thiol-ene resin. In one embodiment, the polymer resin is the thermoplastic polymer selected from the group consisting of polypropylene (PP), polyethylene (PE), polyamide (PA6), polylactic acid (PLA), polybutylene succinate (PBS), and polyethylene terephthalate (PET).

In one embodiment, the polymer resin is the thermosetting resin selected from the group consisting of an epoxy resin, an unsaturated polyester resin, a phenolic resin, a polyurethane resin, a vinyl ester resin, and a melamine-formaldehyde resin. In some embodiments, during curing, the thermosetting resin forms a crosslinked polymer network with a crosslink density between about $2\times10^{-}4$ and $1\times10^{-}3$ mol/cm$^3$.

In certain embodiments, the polymer resin functions as the continuous matrix phase that binds, encapsulates, and transfers load to the natural fibers. The chemical structure, viscosity, and curing behavior of the polymer resin significantly influence fiber wet-out, interfacial adhesion, void formation, and the overall mechanical and durability performance of the composite.

In some embodiments, the polymer resin may be selected from thermosetting resins, thermoplastic polymers, or bio-based thermosetting polymers, depending on the desired balance of stiffness, toughness, thermal stability, and environmental resistance. Suitable thermosetting resins may include epoxy, polyester, vinyl ester, phenolic, polyurethane, melamine-formaldehyde, or furan-based resins. Suitable thermoplastic polymers may include polypropylene (PP), polyethylene (PE), polyamide (PA6), polylactic acid (PLA), polybutylene succinate (PBS), or polyethylene terephthalate (PET). Suitable bio-based thermosetting polymers may include lignin-based resins, tannin-based resins, epoxidized vegetable-oil resins, and furan-derived resins.

In certain embodiments, the polymer resin may exhibit a viscosity between about 50 mPa·s and 2000 mPa·s at the processing temperature to ensure adequate fiber wet-out and infiltration into micro-scale fiber bundles. Lower viscosities may be preferred for densely packed fiber architectures or for vacuum-assisted resin transfer molding (VARTM), whereas higher viscosities may be suitable for compression molding or hot-pressing applications.

In some embodiments, the polymer resin may include reactive diluents, flexibilizers, or toughening agents to modify its rheological and mechanical properties. Reactive diluents such as glycidyl ethers, vinyl monomers, or epoxidized bio-oils may be added at concentrations between about 1 wt. % and 10 wt. % to reduce viscosity and improve fiber wet-out. Flexibilizers, such as aliphatic polyols or elastomeric modifiers, may be added at concentrations between about 2 wt. % and 15 wt. % to increase ductility and impact resistance.

In certain embodiments, the polymer resin may include nanoscale additives, such as nanoclay, graphene nanoplatelets, cellulose nanocrystals, or silica nanoparticles, at loadings between about 0.1 wt. % and 5 wt. % to enhance stiffness, thermal stability, barrier properties, or flame resistance. Nano-fillers may also reduce interfacial void content by promoting resin infiltration and reducing shrinkage during curing.

In some embodiments, the polymer resin may be chemically tailored to improve compatibility with natural fibers. For example, epoxy resins containing hydroxyl-terminated or amine-terminated hardeners may form hydrogen bonds or covalent bonds with cellulose-based fibers. Polyester and vinyl ester resins may be modified with maleic anhydride or glycidyl methacrylate to improve interfacial adhesion. Bio-based thermosetting polymers may be functionalized with carboxyl, hydroxyl, or epoxy groups to enhance chemical bonding with treated or untreated fibers.

In certain embodiments, the polymer resin may include coupling agents, adhesion promoters, or compatibilizers to improve fiber-matrix bonding. Suitable coupling agents may include silane-functionalized epoxy monomers, maleated polyolefins, or bio-derived adhesion promoters such as tannin-based oligomers. These additives may be included at concentrations between about 0.5 wt. % and 5 wt. % to enhance interfacial shear strength and reduce delamination.

In some embodiments, the polymer resin may be pre-heated to a temperature between about 40° C. and 80° C. prior to mixing with the fibers to reduce viscosity and improve infiltration. Pre-heating may be particularly beneficial for high-viscosity bio-based resins or for resins containing nano-fillers that increase viscosity.

In certain embodiments, the polymer resin may be degassed under vacuum prior to mixing to remove entrapped air and reduce void formation during curing. Degassing may be performed at pressures between about 10 kPa and 90 kPa for durations between about 2 minutes and 20 minutes.

In some embodiments, the polymer resin may be formulated to attain a specific crosslink density, glass transition temperature, or thermal degradation onset temperature. Resin formulation parameters such as monomer functionality, hardener type, catalyst concentration, and curing temperature may be adjusted to attain the desired thermal and mechanical performance.

In certain embodiments, the polymer resin may be selected based on environmental considerations such as biodegradability, recyclability, or bio-based content. Bio-derived thermosetting polymers may be used to reduce environmental impact while maintaining mechanical performance comparable to petroleum-derived resins.

In certain embodiments, the crosslink density of the thermosetting or bio-based thermosetting polymer matrix is controlled to attain a balance between stiffness, toughness, thermal stability, and environmental resistance. Crosslink density can be adjusted by selecting curing agents, catalyst concentrations, resin functionality, and curing temperature profiles.

In some embodiments, the crosslink density is determined using dynamic mechanical analysis (DMA) in the rubbery plateau region, where the storage modulus reflects the density of elastically active network chains. The crosslink density ν may be calculated using the rubbery-modulus equation $$v = \frac{E'}{3RT},$$

where E' is the storage modulus measured at a temperature of $T_g$+40° C., R is the universal gas constant, and T is the absolute temperature.

In certain embodiments, the crosslink density may also be determined using solvent swelling experiments in accordance with the Flory-Rehner equation. In such embodiments, cured polymer samples are immersed in a suitable solvent, and the equilibrium swelling ratio is used to calculate the network chain density. This method may be used to validate DMA-derived crosslink density values or to characterize polymers that exhibit limited thermal stability during DMA testing.

In some embodiments, the crosslink density of the polymer matrix may be tailored to enhance fiber-matrix interfacial bonding. Higher crosslink densities may increase matrix stiffness and reduce creep deformation, thereby improving load transfer to the reinforcing fibers. Conversely, lower crosslink densities may increase matrix ductility and energy absorption, which may be advantageous for impact-resistant or fatigue-resistant applications.

In certain embodiments, the crosslink density may influence moisture diffusion and chemical resistance. Higher crosslink densities may reduce free volume within the polymer network, thereby decreasing the rate of water uptake and chemical ingress. This effect may be beneficial when combined with hydrophobic fiber surface treatments or biopolymer-derived coatings.

In some embodiments, the crosslink density may be spatially varied within the composite through staged curing, localized heating, or differential catalyst distribution. Spatially graded crosslink densities may be used to create toughened interlaminar regions, reduce residual stresses, or enhance the performance of gradient fiber architectures.

In some embodiments, thermoplastic polymer may include but is not limited to polyethylene, polypropylene, polystyrene, polyvinyl chloride, polyethylene terephthalate, polybutylene terephthalate, polycarbonate, polyamide, acrylonitrile-butadiene-styrene, polymethyl methacrylate, polyoxymethylene, polyether ether ketone, polyetherimide, polyphenylene sulfide, polyvinylidene fluoride, ethylene-vinyl acetate, polycaprolactone, polyvinyl alcohol, polyacetal, and polybutene.

In one embodiment, the polymer resin is a bio-based thermosetting polymer selected from the group consisting of itaconic acid-based polyesters, mycelium-reinforced epoxy hybrids, polyhydroxyalkanoate-modified thermosets, soy-based epoxies, cardanol-based phenolic resins, and furfuryl alcohol-derived furan resins.

In some embodiments, bio-based thermosetting polymer may include but is not limited to bio-epoxy resin, lignin-based phenolic resin, soy-based epoxy resin, cashew nut shell liquid resin, tannin-based resin, furan-based resin, bio-polyurethane thermoset resin, vegetable oil-based polyester resin, bio-based vinyl ester resin, starch-based thermosetting resin, cellulose-derived thermoset resin, cardanol-based epoxy resin, itaconic acid-based resin, succinic acid-based polyester resin, lactic acid-based thermoset resin, bio-based benzoxazine resin, bio-based cyanate ester resin, rosin-based epoxy resin, bio-based alkyd resin, and chitosan-based thermosetting resin.

In some embodiments, the bio-based thermosetting polymer exhibits a crosslink density between about $1\times10^{-4}$ and $8\times10^{-4}$ mol/cm$^3$, preferably $2\times10^{-4}$ to $8\times10^{-4}$ mol/cm$^3$, preferably $3\times10^{-4}$ to $8\times10^{-4}$ mol/cm$^3$, preferably $4\times10^{-4}$ to $8\times10^{-4}$ mol/cm$^3$, preferably $5\times10^{-4}$ to $8\times10^{-4}$ mol/cm$^3$, preferably $6\times10^{-4}$ to $8\times10^{-4}$ mol/cm$^3$, preferably $7\times10^{-4}$ to $8\times10^{-4}$ mol/cm$^3$.

At step 54, the method 50 includes curing the fiber-polymer resin mixture to form the fiber-reinforced polymer composite. In some embodiments, the fiber-polymer resin mixture is cured at a temperature between 40 and 120° C., preferably 50 and 120° C., preferably 60 and 120° C., preferably 70 and 120° C., preferably 80 and 120° C., preferably 90 and 120° C., preferably 100 and 120° C., preferably 110 and 120° C. and a pressure of from 0.2 to 1.5 MPa, preferably 0.3 to 1.5 MPa, preferably 0.4 to 1.5 MPa, preferably 0.5 to 1.5 MPa, preferably 0.6 to 1.5 MPa, preferably 0.7 to 1.5 MPa, preferably 0.8 to 1.5 MPa, preferably 0.9 to 1.5 MPa, preferably 1.0 to 1.5 MPa, preferably 1.1 to 1.5 MPa, preferably 1.2 to 1.5 MPa, preferably 1.3 to 1.5 MPa, preferably 1.4 to 1.5 MPa.

In certain embodiments, the curing of the fiber-polymer resin mixture is carried out under controlled thermal and pressure conditions to promote resin infiltration, polymer crosslinking, and consolidation of the composite structure. The curing temperature and pressure influence resin viscosity, fiber wet-out, void elimination, and the development of the polymer network, which in turn contribute to the mechanical and durability properties of the final composite.

In some embodiments, the curing process may be performed in a single-stage thermal cycle in which the fiber-polymer resin mixture is heated to a temperature between about 40° C. and 120° C. and maintained at that temperature for a duration between about 15 minutes and 4 hours. The curing pressure may be maintained between about 0.2 MPa and 1.5 MPa to ensure intimate fiber-matrix contact and to minimize void formation. Higher pressures may be used for high-viscosity resins or densely packed fiber architectures to promote resin infiltration into micro-scale fiber bundles.

In certain embodiments, the curing process may be performed using a staged or multi-step thermal profile. For example, the fiber-polymer resin mixture may undergo an initial gelation stage at a temperature between about 40° C. and 70° C. to allow resin flow and fiber wet-out, followed by a post-cure stage at a temperature between about 90° C. and 120° C. to complete crosslinking and attain the desired crosslink density. Staged curing may reduce residual stresses, improve dimensional stability, and enhance interfacial bonding.

In some embodiments, the curing process may be performed under vacuum, partial vacuum, or inert atmosphere to reduce entrapped air, prevent oxidation, or minimize moisture-induced defects. Vacuum levels between about 10 kPa and 90 kPa may be used to remove volatiles and improve resin infiltration. Inert atmospheres, such as nitrogen or argon, may be used to cure bio-based thermosetting polymers that are sensitive to oxidative degradation.

In certain embodiments, the curing process may be tailored to the specific polymer resin used. For thermosetting resins such as epoxy, polyester, or vinyl ester, curing may involve exothermic crosslinking reactions that require controlled heating rates to prevent thermal runaway. For thermoplastic polymers such as polypropylene, polyethylene, or polylactic acid, curing may involve melting and solidification cycles in which the resin is heated above its melting temperature and then cooled under pressure to attain consolidation.

In some embodiments, the curing pressure may be varied during the curing cycle. For example, a lower pressure may be applied during the initial gelation stage to allow resin flow, followed by a higher pressure during the post-cure stage to consolidate the laminate and eliminate voids. Pressure cycling may be used to improve resin infiltration into tightly packed fiber bundles or to reduce interlaminar defects.

In certain embodiments, the curing process may include a post-curing step in which the composite is heated to a temperature between about 80° C. and 150° C. after initial curing to increase crosslink density, improve thermal stability, and enhance mechanical performance. Post-curing may be particularly beneficial for bio-based thermosetting polymers, which may require extended heating to complete polymerization.

In some embodiments, the curing process may be spatially controlled to produce gradient crosslink densities within the composite. Gradient curing may be attained by applying localized heating, differential catalyst distribution, or selective infrared or microwave curing. Such gradient structures may improve toughness, reduce residual stresses, or enhance interlaminar fracture resistance.

In certain embodiments, the curing process may be monitored in real time using techniques such as differential scanning calorimetry (DSC), dielectric analysis (DEA), or infrared spectroscopy to track the progression of polymerization. Real-time monitoring may be used to optimize curing time, prevent under-curing or over-curing, and ensure consistent composite quality.

In some embodiments, the curing process may be adapted for different manufacturing methods, including compression molding, vacuum-assisted resin transfer molding (VARTM), hot-pressing, autoclave curing, or oven curing. The curing temperature, pressure, and duration may be adjusted based on resin viscosity, fiber architecture, and desired laminate thickness.

In certain embodiments, the fiber-polymer resin mixture may be consolidated using vacuum-assisted resin transfer molding (VARTM), compression molding, hot-pressing, or autoclave curing. The choice of consolidation method may depend on the polymer resin's viscosity, the desired laminate thickness, and the required fiber alignment.

In some embodiments, the composite may be fabricated as a unidirectional laminate, a woven fabric laminate, a stitched multiaxial laminate, or a randomly oriented mat. The laminate architecture may be selected to optimize load transfer in structural retrofitting applications.

In certain embodiments, the fiber-polymer resin mixture may be subjected to a staged curing cycle comprising an initial low-temperature gelation step between about 40° C. and 70° C., followed by a post-cure step between about 90° C. and 120° C. to attain the desired crosslink density.

In some embodiments, before mixing (step 52), the natural fibers are treated with one or more of the following: alkali, an enzyme, a biological agent, a silane coupling agent, or a biopolymer-derived hydrophobic coating.

In certain embodiments, sodium hydroxide treatment modifies natural fibers by combining surface cleaning, partial delignification, hemicellulose removal, and fibrillation enhancement. NaOH disrupts hydrogen bonding within the lignocellulosic structure, causing swelling of the fiber cell wall and increased accessibility of cellulose microfibrils. This swelling effect may increase the surface area available for bonding with the polymer matrix and improve mechanical interlocking.

In some embodiments, sodium hydroxide treatment may be conducted at concentrations between about 1 wt. % and 10 wt. % for durations between about 10 minutes and 4 hours, depending on the desired degree of modification. Lower concentrations may remove surface impurities and waxes without significantly altering fiber stiffness, whereas higher concentrations may induce partial delignification and increased fibrillation, thereby enhancing interfacial adhesion.

In certain embodiments, the NaOH treatment may be performed at temperatures between about 25° C. and 80° C. to accelerate alkaline hydrolysis of hemicellulose and lignin. Elevated temperatures may increase reaction kinetics and promote uniform swelling of the fiber cell wall. The treated fibers may then be washed with deionized water until the pH is neutral to remove residual alkali and reaction byproducts.

In some embodiments, sodium hydroxide treatment may increase the crystallinity index of the cellulose phase by removing amorphous hemicellulose and lignin. Increased crystallinity may enhance the fibers' tensile strength and stiffness, while removing amorphous components may improve fiber-matrix compatibility by exposing additional hydroxyl groups for chemical bonding or silane coupling.

In certain embodiments, NaOH treatment may be combined with mechanical agitation, ultrasonication, or vacuum-assisted impregnation to promote uniform penetration of the alkali solution into fiber bundles. Ultrasonication may disrupt surface contaminants and enhance alkaline diffusion, while vacuum-assisted impregnation may remove entrapped air and facilitate deeper chemical modification.

In some embodiments, the extent of NaOH-induced modification may be quantified by measuring changes in fiber diameter, surface roughness, crystallinity index, or chemical composition. For example, NaOH-treated fibers may exhibit a reduction in surface wax content, an increase in surface hydroxyl concentration, and a measurable increase in surface roughness relative to untreated fibers.

In certain embodiments, sodium hydroxide treatment may be used as a pre-treatment step prior to enzymatic, biological, silane, or hydrophobic coating treatments. Alkali pretreatment may remove surface impurities and increase surface porosity, thereby enhancing the effectiveness of subsequent treatments and improving the overall fiber-matrix interfacial strength.

In some embodiments, NaOH treatment may reduce interfacial void content in the final composite by improving resin wet-out and reducing fiber surface hydrophobicity. Improved wet-out may enhance load transfer efficiency, reduce microcrack formation, and improve long-term durability under mechanical, thermal, and chemical exposure.

In some embodiments, an alkali may include but is not limited to potassium hydroxide, lithium hydroxide, calcium hydroxide, magnesium hydroxide, barium hydroxide, strontium hydroxide, ammonium hydroxide, potassium carbonate, sodium carbonate, potassium bicarbonate, sodium bicarbonate, calcium carbonate, magnesium carbonate, potassium silicate, sodium silicate, potassium aluminate, sodium aluminate, lithium carbonate, calcium oxide, and magnesium oxide. In a preferred embodiment, alkali is sodium hydroxide.

In some embodiments, an enzyme may include, but is not limited to, amylase, protease, lipase, xylanase, pectinase, invertase, lactase, urease, catalase, peroxidase, oxidase, laccase, phytase, glucosidase, transglutaminase, esterase, dehydrogenase, isomerase, transferase, and hydrolase. In a preferred embodiment, an enzyme selected from the group consisting of cellulase, hemicellulose, and ligninase.

In certain embodiments, biological agents such as fungal or bacterial cultures may be used to modify the surface chemistry and microstructure of natural fibers through biologically mediated degradation pathways. Fungal agents such as *Trichoderma reesei, Phanerochaete chrysosporium*, and *Aspergillus niger* secrete extracellular enzymes, including cellulases, hemicellulases, and lignin-modifying oxidases, that degrade lignocellulosic components at the fiber surface. This controlled biodegradation may increase surface porosity, enhance microfibril exposure, and improve mechanical interlocking with the polymer matrix.

In some embodiments, fungal treatment may be conducted under controlled humidity and aeration conditions to maintain optimal fungal growth and enzyme secretion. The fibers may be incubated on nutrient-limited media to promote surface-directed enzymatic activity rather than bulk fiber degradation. The moisture content of the fibers may be maintained between about 40 wt. % and 70 wt. % to support fungal metabolism while preventing excessive swelling.

In certain embodiments, bacterial agents such as *Enterobacter sichuanensis, Rhodococcus* species, *Pseudomonas putida, Cellulomonas* species, and *Bacillus* species may be used to modify fiber surfaces through enzymatic secretion, oxidative reactions, or biosurfactant production. Bacterial treatment may increase the oxygen-to-carbon atomic ratio, introduce carboxyl and carbonyl functional groups, and reduce hemicellulose content, thereby improving fiber wettability and chemical compatibility with the polymer matrix.

In some embodiments, bacterial treatment may be conducted in liquid culture, semi-solid media, or biofilm-forming environments. Liquid culture may promote uniform bacterial contact with fiber surfaces, while biofilm-based treatment may produce localized enzymatic activity and controlled surface etching. The bacterial culture may further include nutrient supplements, cofactors, or inducers to enhance enzyme production.

In certain embodiments, biological treatment may be combined with chemical or enzymatic treatments to create synergistic effects. For example, a mild alkali pre-treatment may increase fiber porosity and facilitate bacterial colonization, while a post-treatment with silane coupling agents may stabilize newly formed functional groups and improve interfacial bonding.

In some embodiments, the extent of biological modification may be controlled by adjusting culture concentration, incubation time, temperature, nutrient availability, and oxygenation. Controlled biological treatment may enhance fiber-matrix adhesion while minimizing loss of fiber tensile strength.

In some embodiments, a biological agent may include but is not limited to algal agent, viral agent, bacteriophage agent, protozoan agent, actinomycete agent, archaeal agent, cyanobacterial agent, microalgal agent, diatom agent, dinoflagellate agent, amoeboid agent, ciliate agent, flagellate agent, rotifer agent, nematode agent, helminth agent, insect-derived agent, plant-derived agent, animal cell-derived agent, and bioextract-based agent. In a preferred embodiment, a biological agent is selected from the group consisting of a fungal agent and a bacterial agent.

In certain embodiments, the silane coupling agent treatment enhances chemical compatibility between the natural fibers and the polymer matrix by forming covalent bonds at the fiber-matrix interface. Hydrolyzable alkoxy groups on the silane molecule undergo hydrolysis to form silanol groups, which subsequently condense with hydroxyl groups present on the cellulose surface of the natural fibers. The organofunctional group of the silane molecule may then react with or interpenetrate the polymer matrix during curing, thereby forming a molecular bridge that improves interfacial adhesion.

In some embodiments, the silane coupling agent may be pre-hydrolyzed in an aqueous or aqueous-alcoholic solution having a pH between about 3.5 and 5.5 to promote controlled silanol formation. The pre-hydrolyzed silane solution may be aged for about 10 minutes to 2 hours to attain optimal reactivity. The natural fibers may then be immersed, sprayed, or vacuum-impregnated with the silane solution to ensure uniform deposition.

In certain embodiments, the silane treatment may be performed in combination with thermal activation to promote condensation reactions. For example, after application of the silane solution, the fibers may be dried at a temperature between about 60° C. and 100° C. for a duration between about 15 minutes and 120 minutes to facilitate siloxane network formation on the fiber surface. This thermal activation may increase the density of siloxane bonds and improve the durability of the interfacial layer under mechanical and environmental stresses.

In some embodiments, the silane coupling agent may be used in conjunction with other surface treatments, such as alkali, enzymatic, or biological treatments. Sequential treatment may remove surface impurities, increase surface roughness, and expose additional hydroxyl groups, thereby enhancing the effectiveness of the silane coupling agent. Such combined treatments may reduce interfacial void content, increase surface silicon content, and improve interlaminar shear strength of the resulting composite.

In some embodiments, a silane coupling agent may include but is not limited to aminopropyltriethoxysilane, aminopropyltrimethoxysilane, glycidyloxypropyltrimethoxysilane, glycidyloxypropyltriethoxysilane, methacryloxypropyltrimethoxysilane, vinyltrimethoxysilane, vinyltriethoxysilane, phenyltrimethoxysilane, phenyltriethoxysilane, mercaptopropyltrimethoxysilane, mercaptopropyltriethoxysilane, chloropropyltrimethoxysilane, isobutyltrimethoxysilane, octyltriethoxysilane, methyltrimethoxysilane, ethyltriethoxysilane, propyltrimethoxysilane, hexadecyltrimethoxysilane, trifluoropropyltrimethoxysilane, and bis(triethoxysilyl)ethane.

In certain embodiments, the biopolymer-derived hydrophobic coating forms a moisture-resistant barrier on the surface of the natural fibers, thereby reducing water absorption, swelling, and chemical ingress. Suitable hydrophobic coatings may include cutin-derived coatings, lipid-derived biopolymer coatings, and wax-ester biopolymer films. These coatings may be derived from plant-based sources such as fruit cuticles, vegetable oils, or natural waxes.

In some embodiments, the hydrophobic coating may be applied as a solution, dispersion, or emulsion containing biopolymer precursors, crosslinking agents, or plasticizers. The coating may be deposited onto the fibers by dip-coating, spray-coating, brushing, or vacuum-assisted impregnation. The coated fibers may then be dried or cured at a temperature between about 40° C. and 90° C. to form a continuous hydrophobic layer.

In certain embodiments, the hydrophobic coating may have a thickness of about 50-500 nm, sufficient to reduce surface energy without significantly increasing fiber diameter or reducing fiber packing density. The coating may exhibit a water contact angle between about 70° and 110°, indicating enhanced hydrophobicity relative to untreated fibers.

In some embodiments, multilayer hydrophobic coatings may be used to attain improved performance. For example, a cutin-derived base layer may be applied to provide chemical resistance, followed by a lipid-derived top layer to enhance flexibility and crack resistance. Multilayer coatings may reduce moisture diffusion coefficients, improve long-term durability, and enhance retention of mechanical properties under acidic, alkaline, or saline exposure.

In certain embodiments, the hydrophobic coating may be combined with silane coupling agents to form a dual-function interfacial layer that provides both chemical bonding and moisture resistance. Such combined treatments may significantly reduce interfacial degradation and improve composite performance under aggressive service conditions.

In some embodiments, a biopolymer-derived hydrophobic coating may include, but is not limited to, chitosan-based hydrophobic coating, cellulose acetate coating, cellulose stearate coating, starch-based hydrophobic coating, lignin-based coating, shellac coating, beeswax coating, carnauba wax coating, soy protein-based coating, zein-based coating, polylactic acid coating, polyhydroxyalkanoate coating, alginate ester coating, pectin ester coating, guar gum-based coating, xanthan gum-based coating, pullulan-based coating, gelatin-based hydrophobic coating, casein-based coating, and rosin-based coating. In a preferred embodiment, a biopolymer-derived hydrophobic coating selected from the group consisting of a cutin-derived coating, a lipid-derived biopolymer coating, and a wax-ester biopolymer film.

In certain embodiments, the layered architecture of the fiber-reinforced polymer composite is engineered to optimize load transfer, crack deflection, and long-term durability under mechanical and environmental stresses. The layered architecture may include alternating plies of bamboo fibers and coconut fibers arranged in a predetermined sequence to balance stiffness, toughness, and environmental resistance. The stacking sequence may be selected from symmetric, quasi-symmetric, cross-ply, angle-ply, or hybrid gradient configurations, depending on the intended application.

In some embodiments, the layered architecture comprises a cross-ply configuration in which fiber layers are oriented at 0° and 90° relative to the loading direction. The 0° layers provide axial stiffness and tensile load-bearing capacity, while the 90° layers enhance transverse strength, dimensional stability, and resistance to delamination. The cross-ply configuration may further reduce warpage and residual stresses during curing by balancing thermal expansion coefficients across the laminate.

In certain embodiments, the layered architecture may include a multi-scale hybrid arrangement in which bamboo-rich plies are positioned near the outer surfaces of the laminate to maximize bending stiffness, while coconut-rich plies are positioned near the midplane to enhance impact resistance and energy absorption. This arrangement may improve flexural strength, reduce interlaminar shear stresses, and mitigate crack propagation under cyclic or impact loading.

In some embodiments, the layered architecture may be configured as a gradient laminate in which the bamboo-to-coconut fiber ratio varies continuously or stepwise across the laminate thickness. Gradient architectures may reduce stress concentrations at ply interfaces, improve moisture-induced dimensional stability, and enhance resistance to chemical ingress by distributing lignin-rich coconut fibers in regions most susceptible to environmental exposure.

In certain embodiments, the layered architecture may include interleaf layers comprising thermoplastic films, nano-reinforced resin layers, or biopolymer-derived coatings to further enhance interlaminar fracture toughness. Such interleaf layers may arrest crack propagation, increase energy dissipation during delamination, and improve fatigue resistance under repeated loading.

In some embodiments, the fiber-polymer resin mixture includes a layered architecture of the bamboo fibers and the coconut fibers in a mass ratio between about 30:70 and about 70:30, preferably 35:70 and 65:30, preferably 40:70 and 60:30, preferably 45:70 and 55:30, preferably 50:70 and 50:30, preferably 55:70 and 45:30, preferably 60:70 and 40:30, preferably 65:70 and 45:30. In one embodiment, the layered architecture includes a cross-ply configuration having fiber layers oriented at 0° and 90°.

In some embodiments, each fiber layer has an areal density between about 200 and 1200 g/m$^2$, preferably 300 and 1200 g/m$^2$, preferably 400 and 1200 g/m$^2$, preferably 500 and 1200 g/m$^2$, preferably 600 and 1200 g/m$^2$, preferably 700 and 1200 g/m$^2$, preferably 800 and 1200 g/m$^2$, preferably 900 and 1200 g/m$^2$, preferably 1000 and 1200 g/m$^2$, preferably 1100 and 1200 g/m$^2$.

In some embodiments, each fiber layer has a ply thickness between about 0.2 and 1.5 mm, preferably 0.3 and 1.5 mm, preferably 0.4 and 1.5 mm, preferably 0.5 and 1.5 mm, preferably 0.6 and 1.5 mm, preferably 0.7 and 1.5 mm, preferably 0.8 and 1.5 mm, preferably 0.9 and 1.5 mm, preferably 1.0 and 1.5 mm, preferably 1.1 and 1.5 mm, preferably 1.2 and 1.5 mm, preferably 1.3 and 1.5 mm, preferably 1.4 and 1.5 mm.

In certain embodiments, fiber packing density refers to the volumetric fraction of fibers within a given region of the composite. Fiber packing density may be calculated as the ratio of fiber volume to total composite volume, where fiber volume is determined from measured areal density, ply thickness, and known fiber density. In some embodiments, fiber packing density may range from about 40% to about 70%, depending on fiber type, architecture, and resin viscosity. Higher packing densities may increase stiffness and strength but may require lower-viscosity resins or vacuum-assisted infiltration to ensure adequate wet-out. Lower packing densities may improve toughness and reduce void formation. In certain embodiments, packing density may vary across the laminate thickness to create a gradient architecture that balances stiffness and toughness.

In some embodiments, each fiber layer has a fiber packing density between about 0.35 and about 0.65 g/cm$^3$, preferably 0.40 to 0.65 g/cm$^3$, preferably 0.45 to 0.65 g/cm$^3$, preferably 0.50 to 0.65 g/cm$^3$, preferably 0.55 to 0.65 g/cm$^3$, preferably 0.60 to 0.65 g/cm$^3$.

In certain embodiments, layer-to-layer misalignment refers to the angular or positional deviation between adjacent fiber layers within the composite laminate. Misalignment affects load transfer efficiency, interlaminar shear stresses, and crack propagation pathways. Layer-to-layer misalignment may be quantified by preparing polished cross-sections of the laminate and analyzing fiber orientation using optical microscopy, SEM, or digital image correlation. The angular deviation between adjacent layers may be calculated using a least-squares orientation fit or orientation-tensor analysis. In some embodiments, acceptable misalignment may range between about 0° and 8°, with preferred values between about 0° and 4° to ensure optimal mechanical performance.

In some embodiments, each fiber layer has a layer-to-layer misalignment not greater than about 5°, preferably not greater than 4.5°, preferably not greater than 4°, preferably not greater than 3.5°, preferably not greater than 3°, preferably not greater than 2.5°, preferably not greater than 2.5°, preferably not greater than 2°, preferably not greater than 1.5°.

In certain embodiments, enzymatic treatment of natural fibers removes amorphous or weakly bonded constituents while preserving the structural integrity of the cellulose microfibrils. Enzymes such as cellulase, hemicellulase, and ligninase exhibit substrate-specific catalytic activity that targets pectin, hemicellulose, and lignin domains located at the fiber surface. This selective removal exposes additional hydroxyl groups, increases surface fibrillation, and enhances the accessibility of reactive sites for subsequent coupling or coating treatments.

In some embodiments, the enzymatic treatment may be conducted in a buffered aqueous medium having a pH between about 4.5 and 6.5 to maintain optimal enzyme activity. The enzyme solution may further include stabilizers, cofactors, or surfactants to improve enzyme penetration into fiber bundles. Suitable stabilizers include calcium and magnesium ions and polyols, which can enhance enzyme stability during prolonged incubation.

In certain embodiments, the enzymatic treatment may be performed in a staged or sequential manner. For example, a hemicellulase pre-treatment may be used to remove hemicellulose and open the fiber surface, followed by a cellulase treatment to expose microfibrils, and finally a ligninase treatment to reduce surface lignin content. Sequential enzymatic treatment may produce a hierarchical surface morphology that improves mechanical interlocking with the polymer matrix and enhances interfacial shear strength.

In some embodiments, the enzymatic treatment may be combined with mild mechanical agitation, ultrasonication, or vacuum-assisted impregnation to promote uniform enzyme distribution and penetration into fiber bundles. Ultrasonication may disrupt surface impurities and enhance enzyme-substrate interactions, while vacuum-assisted impregnation may remove entrapped air and facilitate enzyme infiltration.

In certain embodiments, the degree of enzymatic modification may be controlled by adjusting enzyme concentration, incubation time, temperature, and agitation intensity. Higher enzyme concentrations or longer incubation times may increase fibrillation exposure and surface roughness, whereas lower concentrations may preserve fiber stiffness while still improving interfacial bonding.

In some embodiments, the biopolymer-derived hydrophobic coating may be applied as a multilayer film comprising alternating hydrophobic and polar layers. For example, a cutin-derived layer may be deposited first to reduce water uptake, followed by a lipid-derived layer to enhance flexibility and crack resistance. The multilayer coating may have a total thickness between about 50 and 500 nm.

In one embodiment, the natural fibers are treated with the fungal agent. In some embodiments, a fungal agent may include but is not limited to *Penicillium chrysogenum, Fusarium oxysporum, Rhizopus oryzae, Mucor circinelloides, Neurospora crassa, Pleurotus ostreatus, Ganoderma lucidum, Trametes versicolor, Schizophyllum commune, Lentinula edodes, Candida albicans, Saccharomyces cerevisiae, Pichia pastoris, Kluyveromyces lactis, Cryptococcus neoformans, Alternaria alternata, Botrytis cinerea, Colletotrichum gloeosporioides, Verticillium dahliae*, and *Ustilago maydis*. In another embodiment, fungal agent are selected from the group consisting of *Trichoderma reesei, Phanerochaete chrysosporium*, and *Aspergillus niger.*

In some embodiments, the fungal agent is applied at a culture concentration between $10^4$ and $10^8$ CFU/mL, preferably $10^5$ to $10^8$ CFU/mL, preferably $10^6$ to $10^8$ CFU/mL, preferably $10^7$ to $10^8$ CFU/mL for about 10 to 100 hours, preferably 20 to 100 hours, preferably 40 to 100 hours, preferably 60 to 100 hours, preferably 80 to 100 hours at a temperature between 25° C. and 40° C., preferably 30° C. to 40° C., preferably 35° C. to 40° C.

In some embodiments, the natural fibers, when treated with the fungal agent has a lignin reduction between about 10 and 25 wt. %, preferably 12 to 25 wt. %, preferably 14 to 25 wt. %, preferably 16 to 25 wt. %, preferably 18 to 25 wt. %, preferably 20 to 25 wt. %, preferably 22 to 25 wt. %, preferably 24 to 25 wt. %.

In certain embodiments, lignin reduction is determined using the Klason lignin method, in which natural fibers are subjected to 72 wt. % sulfuric acid hydrolysis, followed by gravimetric quantification of the acid-insoluble residue. The percentage reduction in lignin content is calculated relative to untreated natural fibers processed under identical conditions.

In some embodiments, surface roughness is quantified using scanning electron microscopy (SEM) coupled with grayscale texture analysis. A roughness index is computed from pixel-intensity variance across a defined region of interest, and the percentage increase in surface roughness is calculated relative to untreated fibers.

In some embodiments, the natural fibers when treated with the fungal agent has a surface roughness increase between about 10% and 60%, preferably 15% to 60%, preferably 20% to 60%, preferably 25% to 60%, preferably 30% to 60%, preferably 35% to 60%, preferably 40% to 60%, preferably 45% to 60%, preferably 50% to 60%, preferably 55% to 60%, relative to the natural fibers without a surface treatment.

In one embodiment, the natural fibers are treated with the bacterial agent. In some embodiments, the bacterial agent may include, but is not limited to *Escherichia coli, Streptomyces coelicolor, Corynebacterium glutamicum, Micrococcus luteus, Arthrobacter globiformis, Paenibacillus polymyxa, Lactobacillus plantarum, Lactococcus lactis, Clostridium thermocellum, Acetobacter aceti, Gluconobacter oxydans, Azotobacter vinelandii, Azospirillum brasilense, Nitrosomonas europaea, Nitrobacter winogradskyi, Deinococcus radiodurans, Mycobacterium smegmatis, Shewanella oneidensis, Vibrio alginolyticus*, and *Alcaligenes faecalis*. In another embodiment, the bacterial agent is selected from the group consisting of *Enterobacter sichuanensis, Rhodococcus* species, *Pseudomonas putida, Cellulomonas* species, and *Bacillus* species.

In some embodiments, the bacterial agent is applied via incubation between about $10^5$ and $10^8$ CFU/mL, preferably $10^6$ to $10^8$ CFU/mL, preferably $10^7$ to $10^8$ CFU/mL for about 12 to 72 hours, preferably 15 to 72 hours, preferably 20 to 72 hours, preferably 25 to 72 hours, preferably 30 to 72 hours, preferably 35 to 72 hours, preferably 40 to 72 hours, preferably 45 to 72 hours, preferably 50 to 72 hours, preferably 55 to 72 hours, preferably 60 to 72 hours, preferably 65 to 72 hours, preferably 70 to 72 hours at a temperature between about 20° C. and 35° C., preferably 24° C. and 35° C., preferably 25° C. and 35° C., preferably 30° C. and 35° C., preferably 32° C. and 35° C.

In some embodiments, the natural fibers, when treated with the bacterial agent, have a surface oxygen-to-carbon atomic ratio of between about 0.35 and 0.65, preferably 0.40 to 0.65, preferably 0.45 to 0.65, preferably 0.50 to 0.65, preferably 0.55 to 0.65, preferably 0.60 to 0.65.

In some embodiments, the surface oxygen-to-carbon atomic ratio is measured using X-ray photoelectron spectroscopy (XPS) employing a monochromatic Al Kα source. Survey spectra are deconvoluted to quantify elemental composition within the top 5-10 nm of the fiber surface.

In certain embodiments, hemicellulose reduction is determined by a two-step acid hydrolysis procedure, followed by quantification of released neutral sugars by high-performance liquid chromatography (HPLC). The reduction is expressed as the percentage decrease in hemicellulose mass fraction relative to untreated fibers.

In some embodiments, the natural fibers, when treated with the bacterial agent, have a hemicellulose reduction between about 3 and 20 wt. %, preferably 5 and 20 wt. %, preferably 7 and 20 wt. %, preferably 9 and 20 wt. %, preferably 11 and 20 wt. %, preferably 13 and 20 wt. %, preferably 15 and 20 wt. %, preferably 17 and 20 wt. %, preferably 19 and 20 wt. % relative to the natural fibers without the surface treatment.

In certain embodiments, hydroxyl, carboxyl, and carbonyl functional groups are quantified using Fourier-transform infrared spectroscopy (FTIR). Peak-area integration of characteristic absorption bands is used to determine the relative increase in functional group concentration compared with untreated fibers.

In some embodiments, the natural fibers when treated with the bacterial agent has an increase in surface functional groups including hydroxyl, carboxyl, and carbonyl groups between about 5% and about 40%, preferably 10% to 40%, preferably 15% to 40%, preferably 20% to 40%, preferably 25% to 40%, preferably 30% to 40%, preferably 35% to 40% relative to relative to the natural fibers without the surface treatment.

In one embodiment, the natural fibers are treated with the silane coupling agent. In some embodiments, a silane coupling agent may include but is not limited to aminopropyltriethoxysilane, aminopropyltrimethoxysilane, glycidyloxypropyltrimethoxysilane, glycidyloxypropyltriethoxysilane, methacryloxypropyltrimethoxysilane, vinyltrimethoxysilane, vinyltriethoxysilane, phenyltrimethoxysilane, phenyltriethoxysilane, mercaptopropyltrimethoxysilane, mercaptopropyltriethoxysilane, chloropropyltrimethoxysilane, isobutyltrimethoxysilane, octyltriethoxysilane, methyltrimethoxysilane, ethyltriethoxysilane, propyltrimethoxysilane, hexadecyltrimethoxysilane, trifluoropropyltrimethoxysilane, and bis(triethoxysilyl)ethane. In another embodiment, the silane coupling agent selected from the group consisting of 3-aminopropyltriethoxysilane (APS), 3-glycidyloxypropyltrimethoxysilane (GPTMS), vinyltrimethoxysilane (VTMS), methyltrimethoxysilane (MTMS).

In some embodiments, the silane coupling agent is applied to the natural fibers at a concentration between about 0.5 and 3 wt. %, preferably 1.0 to 3 wt. %, preferably 1.5 to 3 wt. %, preferably 2.0 to 3 wt. %, preferably 2.5 to 3 wt. % relative to the total weight of the natural fibers.

In some embodiments, the silane coupling agent is applied to the natural fibers at a temperature between about 60° C. and 100° C., preferably 65° C. and 100° C., preferably 70° C. and 100° C., preferably 75° C. and 100° C., preferably 80° C. and 100° C., preferably 85° C. and 100° C., preferably 90° C. and 100° C., preferably 95° C. and 100° C. for about 15 to 120 minutes, preferably 25 to 120 minutes, preferably 35 to 120 minutes, preferably 45 to 120 minutes, preferably 55 to 120 minutes, preferably 65 to 120 minutes, preferably 75 to 120 minutes, preferably 85 to 120 minutes, preferably 95 to 120 minutes, preferably 105 to 120 minutes, preferably 115 to 120 minutes.

In some embodiments, silicon content on silane-treated fibers is quantified using energy-dispersive X-ray spectroscopy (EDS) integrated with SEM. Silicon weight percentage is calculated from normalized elemental spectra.

In some embodiments, natural fibers treated with a silane coupling agent show an increase in surface silicon content of about 0.5 to 5 wt. %, preferably 1.0 to 5 wt. %, preferably 1.5 to 5 wt. %, preferably 2.0 to 5 wt. %, preferably 2.5 to 5 wt. %, preferably 3.0 to 5 wt. %, preferably 3.5 to 5 wt. %, preferably 4.0 to 5 wt. %, preferably 4.5 to 5 wt. % relative to the total weight of the natural fibers without the surface treatment.

In certain embodiments, interfacial void content refers to the volume fraction of voids located at or near the fiber-matrix interface. Interfacial voids may arise from insufficient resin wet-out, trapped air, or incomplete fiber surface modification. Interfacial void content may be quantified using micro-computed tomography (micro-CT), optical microscopy, or SEM image analysis. Micro-CT may be performed at voxel resolutions between about 1 μm and 5 μm to resolve voids adjacent to fiber surfaces. In some embodiments, interfacial void content may be reduced to between about 0.5% and 5% using silane coupling agents, enzymatic treatments, sodium hydroxide treatments, or optimized curing pressures. Reduced interfacial void content may improve interlaminar shear strength, fatigue resistance, and moisture durability.

In some embodiments, the natural fibers when treated with the silane coupling agent has a reduction in interfacial void content between about 5% and 40%, preferably 10% to 40%, preferably 15% to 40%, preferably 20% to 40%, preferably 25% to 40%, preferably 30% to 40%, preferably 35% to 40% relative to the natural fibers without the surface treatment.

In certain embodiments, surface pectin content refers to the amount of pectin remaining on the outer surface of natural fibers following enzymatic, biological, or chemical treatment. Surface pectin may be quantified using a carbazole colorimetric assay following acid extraction, wherein absorbance at 530 nm is correlated to galacturonic acid concentration. In some embodiments, surface pectin content may be reduced by about 20% to 80% relative to untreated fibers. Reduced pectin content may improve fiber wettability, increase surface hydroxyl availability, and enhance compatibility with silane coupling agents or polymer matrices.

In some embodiments, the natural fibers are treated with the enzyme, resulting in a reduction in surface pectin content between about 5 and 30 wt. %, preferably 10 to 30 wt. %, preferably 15 to 30 wt. %, preferably 20 to 30 wt. %, preferably 25 to 30 wt. % relative to the natural fibers without the surface treatment.

In certain embodiments, fibrillation exposure refers to the degree to which cellulose microfibrils are exposed on the fiber surface following chemical, enzymatic, or mechanical treatment. Fibrillation exposure may be quantified using SEM image analysis by calculating a fibrillation index defined as the ratio of exposed microfibril perimeter to total fiber perimeter within a defined field of view. In some embodiments, fibrillation exposure may increase by about 10% to 60% relative to untreated fibers, depending on treatment severity. Increased fibrillation exposure may enhance mechanical interlocking with the polymer matrix, improve interfacial shear strength, and reduce interfacial void content.

In some embodiment, the natural fibers are treated with the enzyme has an increase in fibrillation exposure between about 10% and 50%, preferably 15% to 50%, preferably 20% to 50%, preferably 25% to 50%, preferably 30% to 50%, preferably 35% to 50%, preferably 40% to 50%, preferably 45% to 50% relative to the natural fibers without the surface treatment.

In some embodiments, the enzyme is contacted with the natural fibers in a solution having an enzyme activity between about 10 to 200 U/mL, preferably 20 to 200 U/mL, preferably 40 to 200 U/mL, preferably 60 to 200 U/mL, preferably 80 to 200 U/mL, preferably 100 to 200 U/mL, preferably 120 to 200 U/mL, preferably 140 to 200 U/mL, preferably 160 to 200 U/mL, preferably 180 to 200 U/mL at a pH between about 4.5 to 6.5, preferably 5.0 to 6.5, preferably 5.5 to 6.5, preferably 6.0 to 6.5 for a duration between about 1 and 24 hours, preferably 2 to 24 hours, preferably 4 to 24 hours, preferably 6 to 24 hours, preferably 8 to 24 hours, preferably 10 to 24 hours, preferably 12 to 24 hours, preferably 14 to 24 hours, preferably 16 to 24 hours, preferably 18 to 24 hours, preferably 20 to 24 hours, preferably 22 to 24 hours and at a temperature between about 30° C. and 55° C., preferably 35° C. to 55° C., preferably 40° C. to 55° C., preferably 45° C. to 55° C., preferably 50° C. to 55° C.

In certain embodiments, the improved performance of the fiber-reinforced polymer composites arises from synergistic interactions between bamboo fibers and coconut fibers that are not predictable from the behavior of either fiber alone. Bamboo fibers contribute high axial stiffness due to their high cellulose crystallinity, whereas coconut fibers contribute enhanced toughness and environmental resistance due to their elevated lignin content and microfibrillar angle. The combination of these two fiber types within a single polymer matrix produces a hybrid reinforcement system that exhibits nonlinear improvements in mechanical and durability properties relative to rule-of-mixtures predictions.

In some embodiments, the hybrid reinforcement system suppresses crack initiation and propagation through a dual-mechanism process in which bamboo fibers resist tensile crack opening while coconut fibers dissipate energy through microfibril pull-out and interfacial friction. This dual mechanism contributes to the observed hybrid synergy index, which ranges from about 1.1 to 1.4, exceeding the theoretical value of 1.0 indicated for non-interactive fiber systems.

In some embodiments, the natural fibers comprise the bamboo fibers and the coconut fibers in a mass ratio between about 30:70 and 70:30, preferably 35:70 and 65:30, preferably 40:70 and 60:30, preferably 45:70 and 55:30, preferably 50:70 and 50:30, preferably 55:70 and 45:30, preferably 60:70 and 40:30, preferably 65:70 and 45:30, based on the total weight of the natural fibers.

In certain embodiments, the bamboo-to-coconut fiber mass ratio may be optimized for specific applications. For example, a ratio between about 60:40 and 70:30 may be preferred for applications requiring high initial stiffness, whereas a ratio between about 40:60 and 30:70 may be preferred for applications requiring enhanced toughness and chemical resistance.

In some embodiments, the hybrid fiber system may be arranged in a gradient architecture in which the bamboo fiber content decreases and the coconut fiber content increases across the laminate thickness. Such gradient architectures may improve impact resistance and delamination toughness.

In some embodiments, the natural fibers have a tensile strength-to-impact energy absorption ratio between about 1.8 and 3.5, preferably 2.0 to 3.5, preferably 2.2 to 3.5, preferably 2.4 to 3.5, preferably 2.6 to 3.5, preferably 2.8 to 3.5, preferably 3.0 to 3.5, preferably 3.2 to 3.5, preferably 3.4 to 3.5. In some embodiments, the tensile strength-to-impact-energy absorption ratio is calculated by dividing the ASTM D3039 tensile strength by the ASTM D256 impact energy for matched specimens.

In some embodiments, the natural fibers have a fiber-packing efficiency between about 0.35 and 0.65 g/cm$^3$, preferably 0.40 to 0.65 g/cm$^3$, preferably 0.45 to 0.65 g/cm$^3$, preferably 0.50 to 0.65 g/cm$^3$, preferably 0.55 to 0.65 g/cm$^3$, preferably 0.60 to 0.65 g/cm$^3$.

In some embodiments, the natural fibers have a hybrid-synergy index between about 1.1 and 1.4, preferably 1.15 to 1.4, preferably 1.2 to 1.4, preferably 1.25 to 1.4, preferably 1.3 to 1.4, preferably 1.35 to 1.4. In certain embodiments, the hybrid-synergy index is calculated as the ratio of the experimentally measured tensile strength of the hybrid composite to the rule-of-mixtures prediction based on the tensile strengths of the corresponding single-fiber composites.

In certain embodiments, tensile strength and tensile modulus are measured in accordance with ASTM D3039, and flexural strength and flexural modulus are measured in accordance with ASTM D790. Specimens are conditioned at 23° C. and 50% relative humidity for at least 48 hours prior to testing.

In some embodiments, the fiber-reinforced polymer composite has a tensile strength between about 180 and 280 MPa, preferably 190 to 280 MPa, preferably 200 to 280 MPa, preferably 210 to 280 MPa, preferably 220 to 280 MPa, preferably 230 to 280 MPa, preferably 240 to 280 MPa, preferably 250 to 280 MPa, preferably 260 to 280 MPa, preferably 270 to 280 MPa as measured in accordance with ASTM D3039.

In some embodiments, the fiber-reinforced polymer composite has a flexural strength between about 220 and 320 MPa, preferably 230 to 320 MPa, preferably 240 to 320 MPa, preferably 250 to 320 MPa, preferably 260 to 320 MPa, preferably 270 to 320 MPa, preferably 280 to 320 MPa, preferably 290 to 320 MPa, preferably 300 to 320 MPa, preferably 310 to 320 MPa as measured in accordance with ASTM D790.

In some embodiments, the fiber-reinforced polymer composite has a tensile modulus between about 10 and 22 GPa, preferably 12 to 22 GPa, preferably 14 to 22 GPa, preferably 16 to 22 GPa, preferably 18 to 22 GPa, preferably 20 to 22 GPa as measured in accordance with ASTM D3039.

In some embodiments, the fiber-reinforced polymer composite has a flexural modulus between about 8 and 18 GPa, preferably 9 to 18 GPa, preferably 10 to 18 GPa, preferably 11 to 18 GPa, preferably 12 to 18 GPa, preferably 13 to 18 GPa, preferably 14 to 18 GPa, preferably 15 to 18 GPa, preferably 16 to 18 GPa, preferably 17 to 18 GPa as measured in accordance with ASTM D790.

In some embodiments, the fiber-reinforced polymer composite has an interlaminar shear strength between about 12 and 28 MPa, preferably 14 to 28 MPa, preferably 16 to 28 MPa, preferably 18 to 28 MPa, preferably 20 to 28 MPa, preferably 22 to 28 MPa, preferably 24 to 28 MPa, preferably 26 to 28 MPa as measured in accordance with ASTM D2344.

In some embodiments, the fiber-reinforced polymer composite has an interlaminar fracture toughness between about 400 and 1000 J/m$^2$, preferably 500 to 1000 J/m$^2$, preferably 600 to 1000 J/m$^2$, preferably 700 to 1000 J/m$^2$, preferably 800 to 1000 J/m$^2$, preferably 900 to 1000 J/m$^2$. The interlaminar fracture toughness is determined using the double-cantilever-beam (DCB) method in accordance with ASTM D5528.

In some embodiments, the fiber-reinforced polymer composite has tensile strength between about 75% and 90%, preferably 77% to 90%, preferably 79% to 90%, preferably 80% to 90%, preferably 83% to 90%, preferably 87% to 90% after 500 hours in about 3 to 5 wt. %, preferably 3.2 to 5 wt. %, preferably 3.4 to 5 wt. %, preferably 3.6 to 5 wt. %, preferably 3.8 to 5 wt. %, preferably 4 to 5 wt. %, preferably 4.2 to 5 wt. %, preferably 4.4 to 5 wt. %, preferably 4.6 to 5 wt. %, preferably 4.8 to 5 wt. % NaCl.

In some embodiments, the fiber-reinforced polymer composite has flexural strength between about 75% and 90%, preferably 77% to 90%, preferably 79% to 90%, preferably 80% to 90%, preferably 83% to 90%, preferably 87% to 90% after 500 hours at a pH of about 3 to 12, preferably 5 to 12, preferably 7 to 12, preferably 9 to 12, preferably 11 to 12.

In some embodiments, the fiber-reinforced polymer composite has tensile and flexural strengths between about 75% and 85%, preferably 77% to 85%, preferably 79% to 85%, preferably 80% to 85%, preferably 83% to 85%, after immersion for 28 days in an aqueous solution selected from the group consisting of 5 wt. % hydrochloric acid, 5 wt. % sodium hydroxide, and 5 wt. % sodium chloride, as measured in accordance with ASTM D570.

In certain embodiments, water absorption is measured in accordance with ASTM D570 using 3 mm-thick specimens immersed in distilled water at 23° C. Mass gain is recorded at 24 hours and 7 days. In some embodiments, the fiber-reinforced polymer composite has a 24-hour water absorption not greater than about 3 wt %, preferably not greater than about 2.5 wt %, preferably not greater than about 2 wt %, preferably not greater than about 1.5 wt %, preferably not greater than about 1 wt %.

In some embodiments, the fiber-reinforced polymer composite has a 7-day water absorption not greater than about 6 wt %, preferably not greater than about 5 wt %, preferably not greater than about 4 wt %, preferably not greater than about 3 wt %, preferably not greater than about 2 wt %, preferably not greater than about 1 wt %.

In certain embodiments, swelling thickness refers to the change in composite thickness resulting from water absorption or moisture exposure. Swelling thickness may be measured using a digital micrometer with a resolution of 1 μm before and after immersion in water at 23° C. for durations of about 24 hours to 7 days. In some embodiments, swelling thickness may range from about 0.5% to about 1.5% at full saturation, depending on fiber treatment, resin type, and fiber architecture. Reduced swelling thickness may be attained through hydrophobic coatings, silane coupling agents, higher crosslink densities, or hybrid fiber architecture that limit pathways for moisture diffusion. Lower swelling thickness may improve dimensional stability, reduce internal stresses, and enhance long-term durability.

In some embodiments, the fiber-reinforced polymer composite has a swelling thickness between about 0.5% and 1.0%, preferably 0.6% to 1.0%, preferably 0.7% to 1.0%, preferably 0.8% to 1.0%, preferably 0.9% to 1.0% after 24 hours of water immersion.

In some embodiments, the fiber-reinforced polymer composite has a swelling thickness between about 1.0% and 1.5%, preferably 1.1% to 1.5%, preferably 1.2% to 1.5%, preferably 1.3% to 1.5%, preferably 1.4% to 1.5% at full-saturation water uptake.

In some embodiments, the fiber-reinforced polymer composite has the swelling thickness not greater than about 4%, preferably not greater than about 3 wt %, preferably not greater than about 2 wt %, preferably not greater than about 1 wt %. after 7 days of water immersion.

In some embodiments, the fiber-reinforced polymer composite has a glass-transition temperature between about 80° C. and 180° C., preferably 90° C. to 180° C., preferably 100° C. to 180° C., preferably 110° C. to 180° C., preferably 120° C. to 180° C., preferably 130° C. to 180° C., preferably 140° C. to 180° C., preferably 150° C. to 180° C., preferably 160° C. to 180° C., preferably 170° C. to 180° C. The glass-transition temperature is measured using differential scanning calorimetry (DSC) in accordance with ASTM E1356.

In some embodiments, the fiber-reinforced polymer composite has a thermal-degradation onset temperature of at least about 280° C., preferably at least about 270° C., preferably at least about 260° C., preferably at least about 250° C., preferably at least about 240° C., preferably at least about 230° C., preferably at least about 220° C., preferably at least about 210° C., preferably at least about 200° C. The thermal degradation onset temperature is determined by thermogravimetric analysis (TGA) in accordance with ASTM E1131, defined as the temperature at which 5% mass loss occurs.

In some embodiments, the fiber-reinforced polymer composite has a storage modulus between about 2 and 6 GPa, preferably 2.5 to 6 GPa, preferably 3 to 6 GPa, preferably 3.5 to 6 GPa, preferably 4 to 6 GPa, preferably 4.5 to 6 GPa, preferably 5 to 6 GPa, preferably 5.5 to 6 GPa at 25° C. as measured using DMA in accordance with ASTM D4065 and ASTM D7028 at a frequency of 1 Hz and a heating rate of 3° C./min.

In some embodiments, the fiber-reinforced polymer composite has the storage modulus of about 0.8 to 3.0 GPa at a temperature between about 75° C. and 100° C., preferably 80° C. to 100° C., preferably 85° C. to 100° C., preferably 90° C. to 100° C., preferably 95° C. to 100° C. as measured in accordance with ASTM D7028.

In some embodiments, the fiber-reinforced polymer composite has a fatigue life of at least about $10^5$ cycles at a stress amplitude of 40% to 50%, preferably 42% to 50%, preferably 44% to 50%, preferably 46% to 50%, preferably 48% to 50% of the tensile strength between about 180 and 280 MPa, preferably 190 to 280 MPa, preferably 200 to 280 MPa, preferably 210 to 280 MPa, preferably 220 to 280 MPa, preferably 230 to 280 MPa, preferably 240 to 280 MPa, preferably 250 to 280 MPa, preferably 260 to 280 MPa, preferably 270 to 280 MPa. In certain embodiments, fatigue life is evaluated using tension-tension cyclic loading in accordance with ASTM D3479 at a stress ratio R=0.1 and a frequency of 5 Hz.

In some embodiments, the fiber-reinforced polymer composite has an impact strength between about 35 and 80 $kJ/m^2$, preferably 40 to 80 $kJ/m^2$, preferably 45 to 80 $kJ/m^2$, preferably 50 to 80 $kJ/m^2$, preferably 55 to 80 $kJ/m^2$, preferably 60 to 80 $kJ/m^2$, preferably 65 to 80 $kJ/m^2$, preferably 70 to 80 $kJ/m^2$, preferably 75 to 80 $kJ/m^2$ as measured using the notched Izod method in accordance with ASTM D256.

In some embodiments, the fiber-reinforced polymer composite has a limiting oxygen index of at least about 26% as measured in accordance with ASTM D2863, and a thermal conductivity between about 0.08 and 0.18 W/(mK), preferably 0.09 and 0.18 W/(mK), preferably 0.10 and 0.18 W/(mK), preferably 0.11 and 0.18 W/(mK), preferably 0.12 and 0.18 W/(mK), preferably 0.13 and 0.18 W/(mK), preferably 0.14 and 0.18 W/(mK), preferably 0.15 and 0.18 W/(mK), preferably 0.16 and 0.18 W/(mK), preferably 0.17 and 0.18 W/(mK). In certain embodiments, thermal conductivity is measured using a guarded heat-flow meter in accordance with ASTM E1530 at 25° C. under a contact pressure of 0.3 MPa.

In some embodiments, the limiting oxygen index may be increased by incorporating phosphorus-containing silane coupling agents or bio-derived flame retardants, such as phytic acid, tannin extracts, or lignin-based additives.

In certain embodiments, the fiber-reinforced polymer composites exhibit reduced moisture diffusion coefficients due to the combined effects of fiber surface modification and hydrophobic polymer matrices. Moisture diffusion may be quantified using Fickian diffusion modeling, and the diffusion coefficient may be between about $1\times10^{-8}$ and $5\times10^{-7}$ $cm^2/s$.

In some embodiments, the fiber-reinforced polymer composite may exhibit reduced chemical ingress due to lignin-rich coconut fibers, which act as natural barriers to acidic and alkaline species. The chemical resistance may be further enhanced by applying biopolymer-derived hydrophobic coatings that reduce capillary absorption at fiber-matrix interfaces.

In certain embodiments, the fiber-reinforced polymer composite may exhibit improved thermal stability due to the presence of lignin-rich coconut fibers, which undergo char formation at elevated temperatures. The char layer may act as a thermal barrier, reducing heat transfer into the composite interior.

In certain embodiments, the fiber-reinforced polymer composite may exhibit strain-hardening behavior under tensile loading due to progressive fiber engagement and microfibril alignment. The strain-hardening modulus may be between about 0.1 and 1.0 GPa.

In some embodiments, the fiber-reinforced polymer composite may exhibit enhanced fatigue resistance due to the presence of coconut fibers, which dissipate cyclic loading energy through microfibril sliding and viscoelastic damping. The fatigue resistance may be quantified using S—N curves generated in accordance with ASTM D3479.

The following examples are provided for illustration and are not to be construed as limitations of the present disclosure, as many variations thereof are possible without departing from the spirit and scope of the present disclosure.

EXAMPLES

The following examples demonstrate a method of producing a fiber-reinforced polymer composite. The examples are provided for illustration and are not to be construed as limitations of the present disclosure, as many variations thereof are possible without departing from the spirit and scope of the present disclosure.

Example 1: Synthesis of Fiber-Reinforced Polymer Composite

In this present disclosure, natural fibers, including bamboo fibers and coconut fibers, are disposed within a polymer matrix at a controlled fiber-to-polymer ratio ranging from about 2:1 to 5:1 based on the total weight of the fiber-polymer matrix. Before incorporation, the surfaces of the natural fibers are subjected to one or more surface modification treatments selected from alkali treatment using sodium hydroxide; enzymatic treatment including cellulase, hemicellulose, and ligninase; biological treatment employing fungal or bacterial agents; silane coupling agent treatment; or application of a biopolymer-derived hydrophobic coating selected from cutin-derived coatings, lipid-derived biopolymer coatings, and wax-ester biopolymer films. These treatments enhance interfacial bonding, reduce moisture susceptibility, and mitigate degradation pathways within the composite system.

The fiber-polymer matrix comprises at least one of a thermosetting resin, a thermoplastic polymer, or a bio-based thermosetting polymer, thereby enabling adaptability to different retrofitting requirements and sustainability objectives. The matrix is subsequently cured at a temperature between about 40° C. and 120° C. and at a pressure between about 0.2 MPa and 1.5 MPa to obtain a consolidated fiber-reinforced polymer composite with improved structural integrity.

Coconut fiber-reinforced polymer composites demonstrated improved or retained tensile strength under acidic exposure (5% HCl), exhibiting an approximate 2% increase, whereas bamboo fiber composites showed noticeable deterioration under similar conditions. In addition, coconut fiber composites exhibited superior thermal stability at elevated temperatures up to 200° C., maintaining tensile strength with significantly lower variability compared to bamboo fiber composites. In contrast, bamboo fiber-reinforced polymer composites, although possessing higher initial mechanical strength, underwent severe degradation when exposed to alkaline and saline environments, with flexural strength losses reaching up to 67%. These observations clearly establish that fiber selection in natural fiber-reinforced polymer composites is not interchangeable and that fiber-matrix interactions under environmental stress conditions govern composite performance in a non-linear and often unpredictable manner, deviating from trends anticipated from the intrinsic properties of the individual constituents. Furthermore, the cited references do not disclose or teach the observed differential chemical resilience between bamboo and coconut fibers embedded within polymer matrices under prolonged aggressive environments, nor do they anticipate the counterintuitive enhancement in tensile strength exhibited by coconut fiber composites under acidic exposure

TABLE 1

Descriptive statistics data for the laminate's performance in a different medium

| Property& Condition | Bamboo FRP Mean | Bamboo FRP Std. Dev | Bamboo FRP Min | Bamboo FRP Max | Coconut FRP Mean | Coconut FRP Std. Dev | Coconut FRP Min | Coconut FRP Max |
|---|---|---|---|---|---|---|---|---|
| Weight Change (%) - Environmental Exposure | 69.79 | 14.77 | 53.13 | 81.25 | 39.31 | 24.37 | 15.38 | 64.10 |
| Tensile Strength · (MPa) Environmental Exposure | 63.25 | 3.40 | 60.0 | 68.0 | 62.75 | 1.89 | 60.0 | 64.0 |
| Flexural Strength (MPa) Environmental Exposure | 4.03 | 2.65 | 2.7 | 8.0 | 4.65 | 1.30 | 2.7 | 5.3 |
| Tensile Strength (MPa) Elevated Temperature | 65.20 | 3.11 | 62.0 | 69.0 | 62.20 | 0.84 | 61.0 | 63.0 |
| Flexural Strength (MPa) Elevated Temperature | 4.28 | 2.36 | 2.7 | 8.0 | 4.80 | 2.21 | 2.7 | 8.0 |

Figure 5:
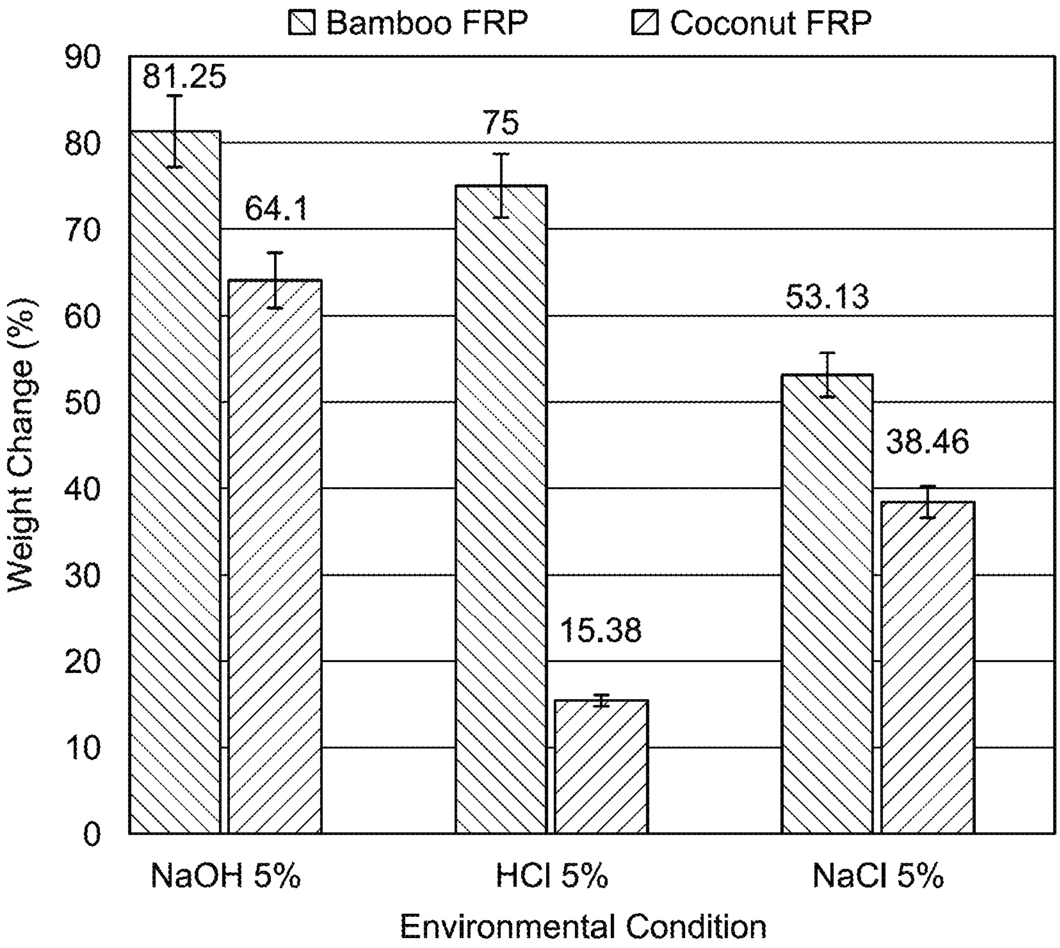
FIG. 5 is a graph showing weight variation in laminates after exposure to chemicals, according to certain embodiments.

FIG. 5 compares the percentage weight change of Bamboo FRP and Coconut FRP under different environmental conditions (5% NaOH, 5% HCl, and 5% NaCl). Across environments, Bamboo FRP shows greater weight change than Coconut FRP, indicating greater susceptibility to chemical exposure. The maximum weight change occurs in NaOH (alkaline condition) for both composites, while HCl causes a sharp reduction in weight change for Coconut FRP compared to Bamboo FRP. Overall, Coconut FRP demonstrates better chemical resistance than Bamboo FRP across the tested conditions.

Figure 6:
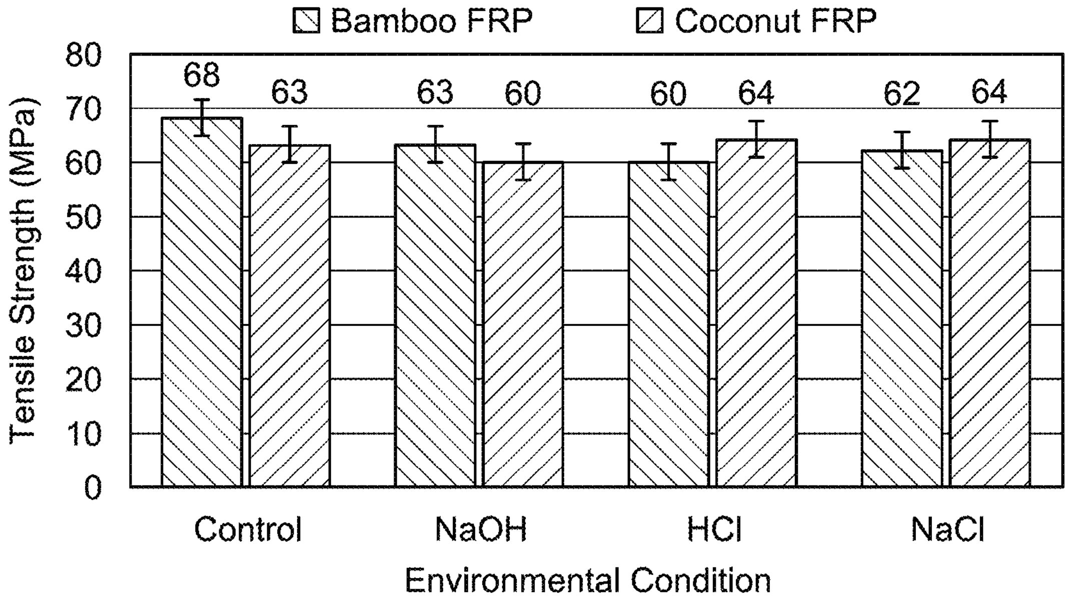
FIG. 6 is a graph showing the effect of chemicals on the tensile properties of laminates, according to certain embodiments.

FIG. 6 compares the tensile strength of Bamboo FRP and Coconut FRP under control, NaOH, HCl, and NaCl environments. Both composites show a reduction in tensile strength after chemical exposure, with NaOH causing the most noticeable degradation. Bamboo FRP retains slightly higher tensile strength than Coconut FRP across most conditions, indicating comparatively better resistance.

Figure 7:
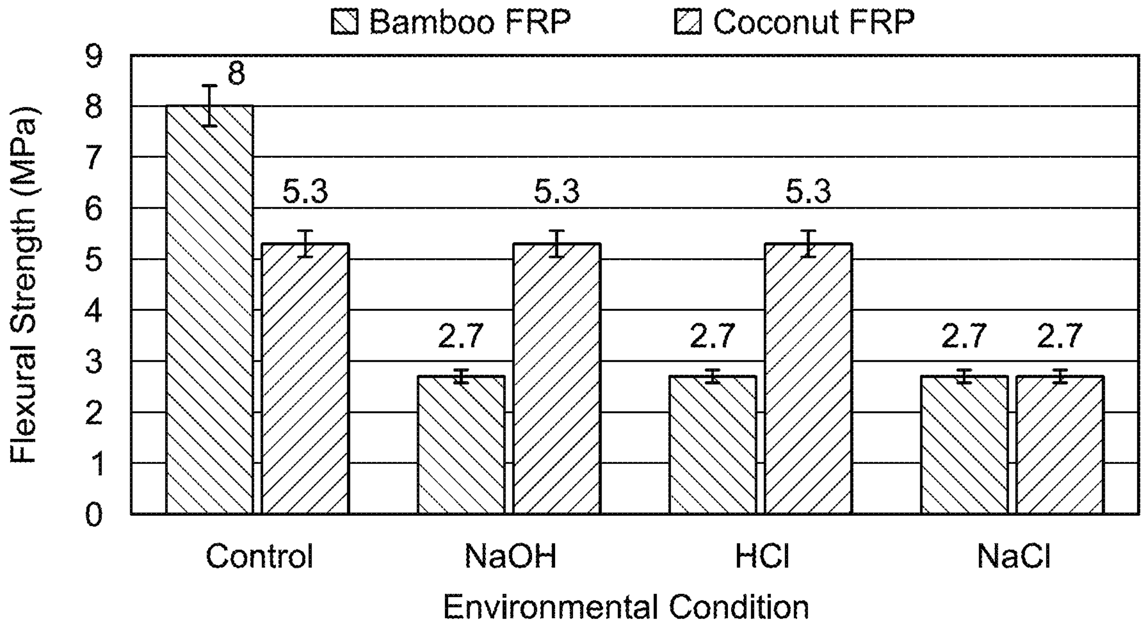
FIG. 7 is a graph showing the effect of chemicals on the flexural properties of laminates, according to certain embodiments.

FIG. 7 compares the flexural strength of the two composites; both decrease significantly in chemical environments relative to the control condition. Bamboo FRP shows a sharp drop in flexural strength after exposure, while Coconut FRP maintains relatively stable values in NaOH and HCl, indicating better flexural performance under aggressive chemical conditions.

Figure 8A:
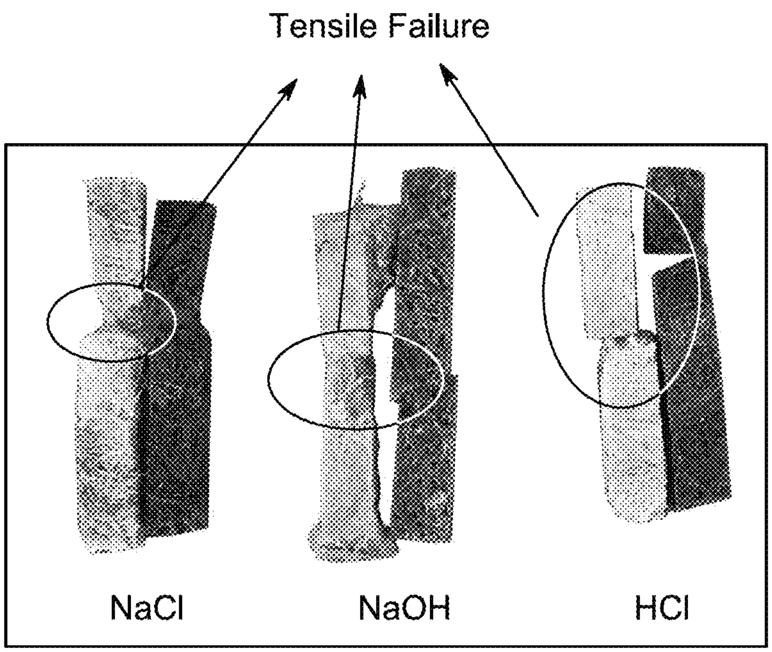
FIG. 8A is a photograph showing failed specimens after a tensile test, according to certain embodiments.
Figure 8B:
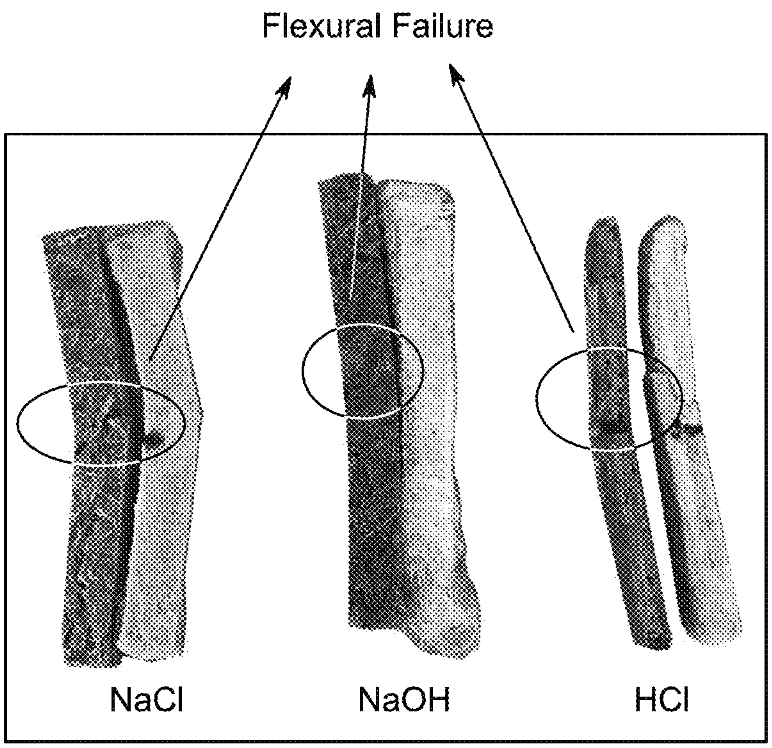
FIG. 8B is a photograph showing failed specimens after a flexural test, according to certain embodiments.

FIG. 8A and FIG. 8B visually show surface degradation of Bamboo FRP and Coconut FRP after immersion in NaCl, NaOH, and HCl solutions. NaOH-treated samples exhibit the most severe fiber swelling, discoloration, and surface damage, confirming strong chemical attack. HCl and NaCl cause comparatively moderate deterioration.

Figure 9A:
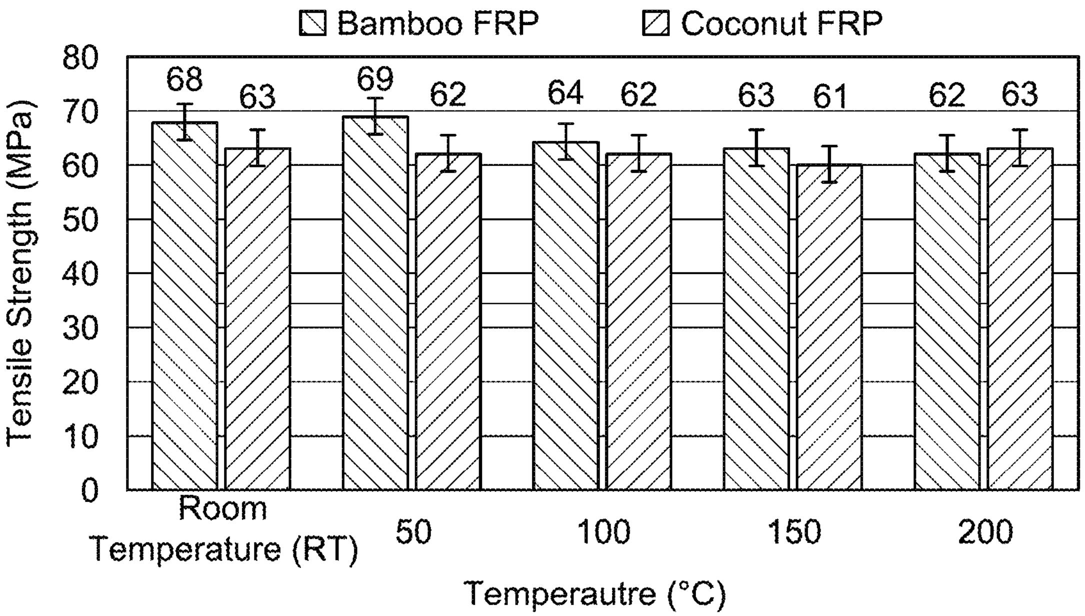
FIG. 9A is a comparison of tensile strength under elevated temperatures, according to certain embodiments.
Figure 9B:
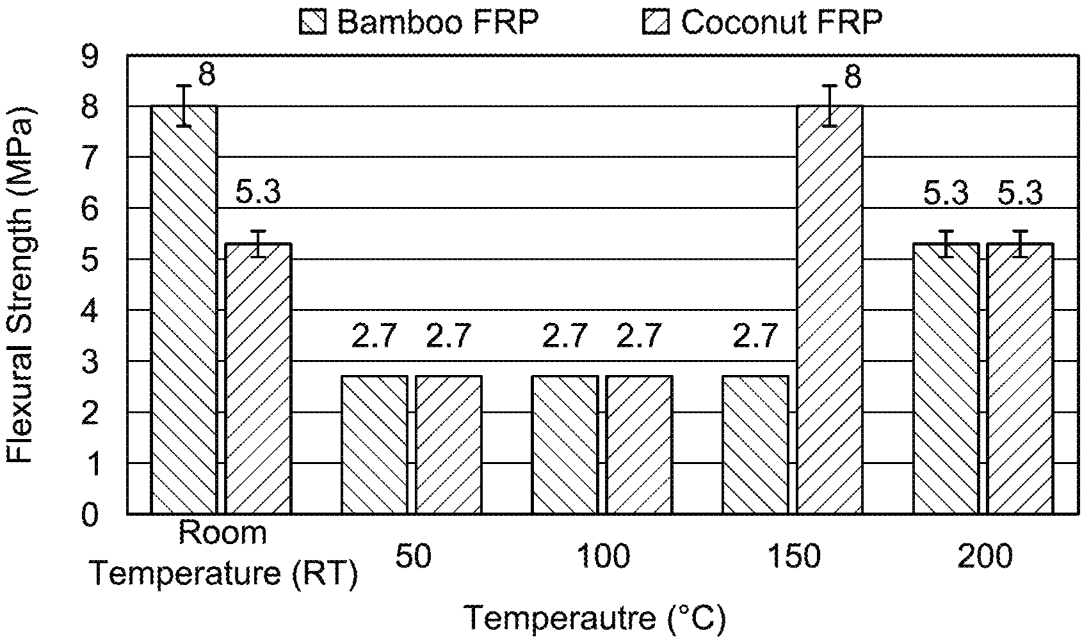
FIG. 9B is a comparison of flexural strength under elevated temperatures, according to certain embodiments.
Figure 10A:
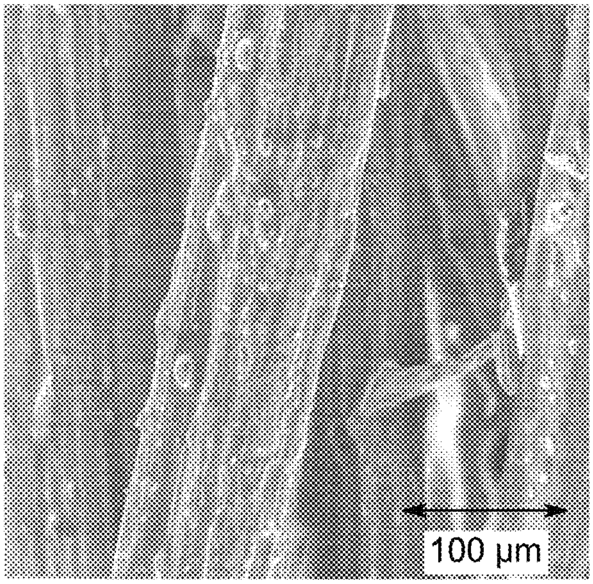
FIG. 10A is a scanning electron microscope (SEM) image of bamboo FRP after exposure to bamboo control, according to certain embodiments.
Figure 10B:
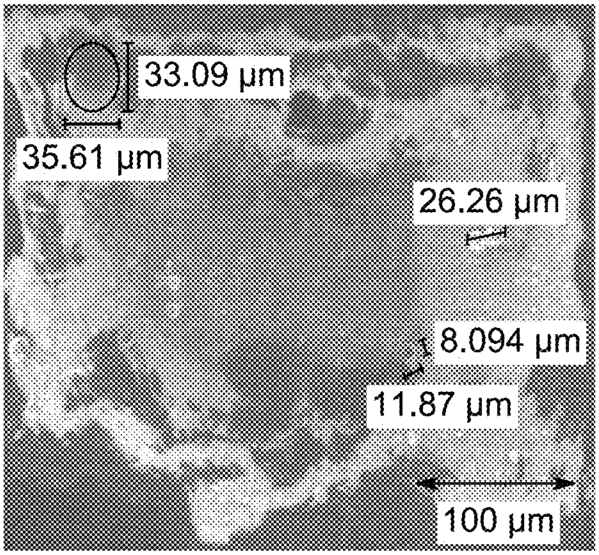
FIG. 10B is a SEM image of bamboo FRP after exposure to bamboo NaOH, according to certain embodiments.
Figure 10C:
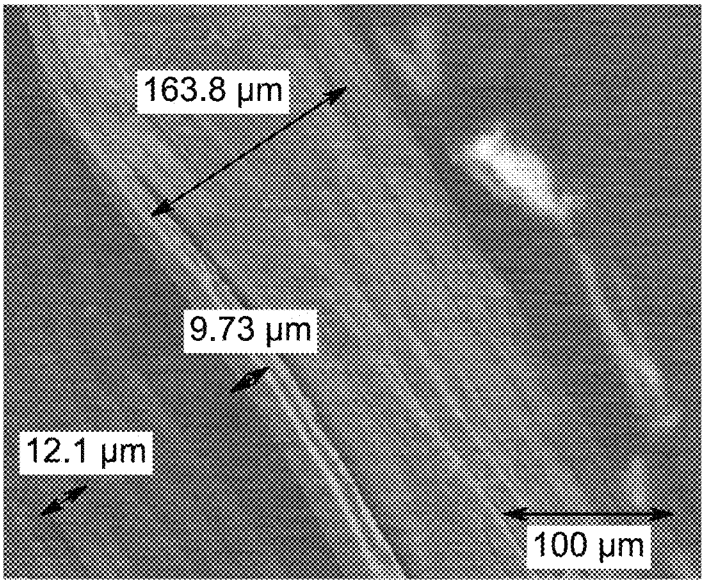
FIG. 10C is a SEM image of bamboo FRP after exposure to bamboo HCl, according to certain embodiments.
Figure 10D:
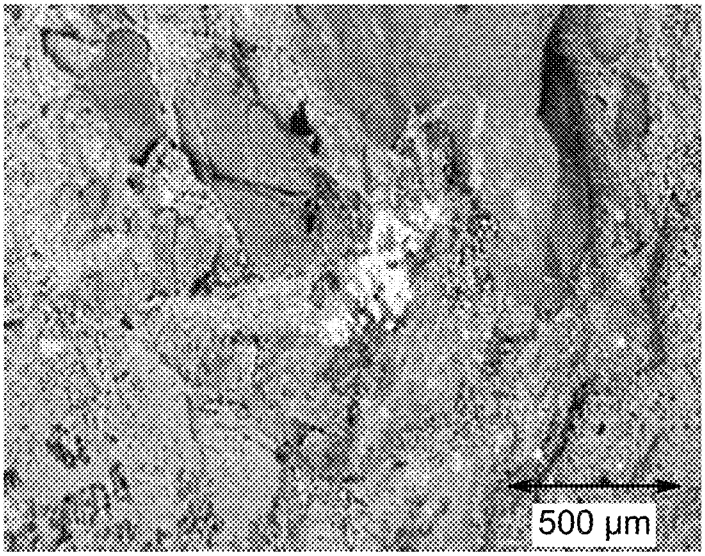
FIG. 10D is a SEM image of bamboo FRP after exposure to bamboo NaCl, according to certain embodiments.
Figure 11A:
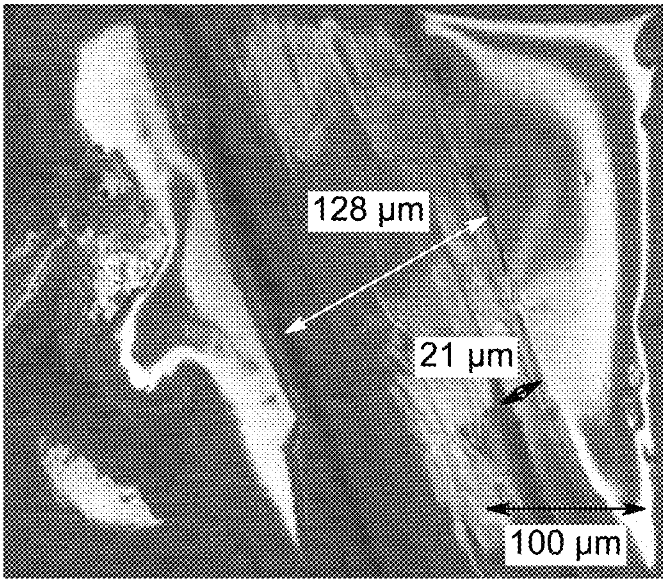
FIG. 11A is a SEM image of bamboo FRP after exposure to coconut control, according to certain embodiments.
Figure 11B:
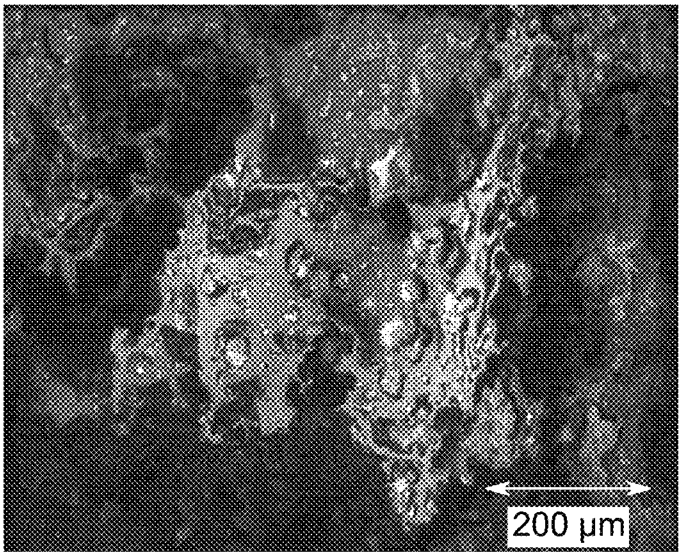
FIG. 11B is a SEM image of bamboo FRP after exposure to coconut NaOH, according to certain embodiments.
Figure 11C:
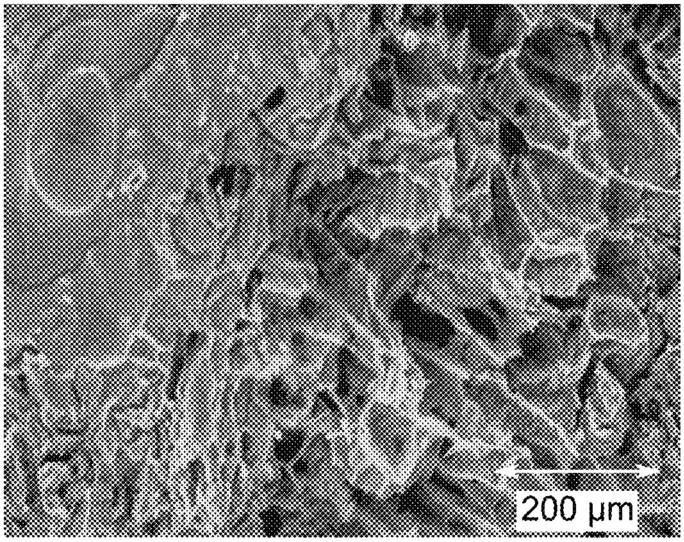
FIG. 11C is a SEM image of bamboo FRP after exposure to coconut HCl, according to certain embodiments.
Figure 11D:
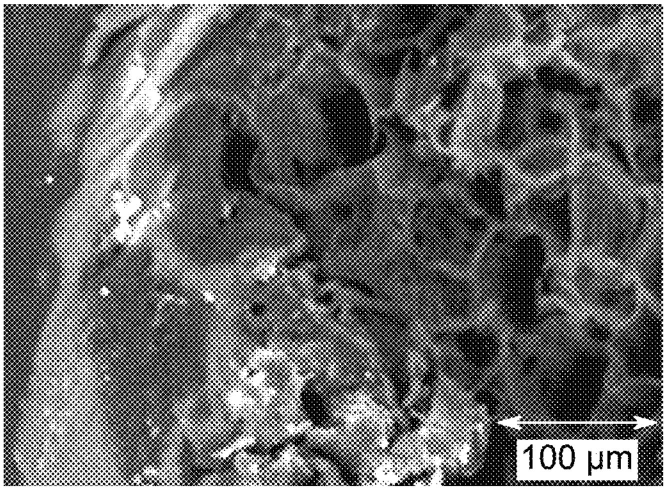
FIG. 11D is a SEM image of bamboo FRP after exposure to coconut NaCl, according to certain embodiments.

FIG. 9A illustrates the effect of temperature on tensile strength. Both bamboo FRP and coconut FRP show a gradual decrease in tensile strength as temperature increases from room temperature to 200° C. Bamboo FRP maintains marginally higher tensile strength throughout, indicating slightly better thermal stability. FIG. 9B illustrates the effect of temperature on flexural strength. Flexural strength drops sharply at elevated temperatures for both composites. Bamboo FRP shows significant loss beyond room temperature, while Coconut FRP demonstrates a partial recovery at higher temperatures, possibly due to matrix softening and fiber rearrangement.

FIGS. 10A-10D shows SEM micrographs of bamboo FRP, revealing fiber pull-out, microcracks, and void formation in Bamboo FRP after exposure. Chemical treatment leads to interfacial debonding between fiber and matrix, while untreated samples show smoother fiber surfaces and better adhesion. FIGS. 11A-11D shows SEM micrographs of Coconut FRP, illustrating relatively compact fiber-matrix bonding with fewer cracks compared to Bamboo FRP. Although chemical exposure induces porosity and surface roughness, the fiber structure appears more intact, which supports the better chemical resistance observed in the mechanical results.

The experimental program confirms that degradation in the investigated composites is predominantly governed by the integrity of the fiber-matrix interface. This conclusion is supported by scanning electron microscopy observations revealing extensive matrix cracking, fiber pull-out, and interfacial debonding following chemical exposure, as well as by weight-change measurements indicating significant moisture and chemical ingress that directly correlates with the observed loss in mechanical properties. The results further demonstrate that untreated or insufficiently protected interfaces degrade rapidly, with bamboo fiber composites being particularly susceptible to interfacial damage. These findings underscore the need to employ protective strategies, such as hydrophobic and bio-derived surface coatings, including lipid-based or cutin-like layers, enzymatic or biological surface modification techniques, and suitable coupling agents, to stabilize the fiber-matrix interface, suppress moisture diffusion, and mitigate chemical attack under aggressive service conditions.

A distinguishing feature of the present invention lies in the complementary performance characteristics of the constituent natural fibers. Bamboo fiber-reinforced polymer composites exhibit higher initial tensile and flexural strength, rendering them particularly suitable for applications requiring immediate load-bearing enhancement. In contrast, coconut fiber-reinforced polymer composites demonstrate superior toughness, durability, and long-term stability, which is attributed to their higher lignin content and enhanced resistance to environmental degradation. This dual-fiber strategy enables deliberate and application-specific material selection based on anticipated environmental exposure and service-life requirements.

Microstructural evaluation, including scanning electron microscopy, confirms improved fiber-matrix adhesion and reduced interfacial degradation, resulting in superior retention of mechanical properties compared with conventional natural fiber-reinforced composites. The disclosed composites further exhibit resistance to prolonged exposure in acidic, alkaline, and saline environments, as well as thermal stability at elevated temperatures of up to approximately 200° C., thereby confirming their suitability for aggressive service conditions.

Accordingly, the invention provides an environmentally resilient, durable, and scalable solution for strengthening and rehabilitating structural elements exposed to chemically aggressive and high-temperature environments. The disclosed composite systems significantly reduce dependence on petroleum-based synthetic retrofitting materials while aligning with global green construction and sustainability initiatives.

The invention therefore delivers dual functional benefits, such as bamboo fiber-reinforced composites, which are preferred for applications requiring higher initial mechanical strength in controlled indoor or mildly aggressive environments, and coconut fiber-reinforced composites, which are particularly suited for marine, coastal, chemical, or fire-prone environments where long-term durability and stability are imperative. By using abundant, renewable natural fibers, the invention offers an environmentally sustainable and cost-effective alternative for retrofitting reinforced concrete beams, slabs, and other structural members, while ensuring resilience under harsh operating conditions.

Numerous modifications and variations of the present disclosure are possible in light of the above teachings. It is therefore to be understood that within the scope of the appended claims, the invention may be practiced otherwise than as specifically described herein.

The invention claimed is:

1. A method of producing a fiber-reinforced polymer composite comprising:

mixing natural fibers comprising bamboo fibers and coconut fibers with a polymer resin at a fiber-to-polymer resin mass ratio of from 2:1 to 5:1, based on the total weight of the polymer resin, to form a fiber-polymer resin mixture, curing the fiber-polymer resin mixture to form the fiber-reinforced polymer composite, wherein, before the mixing, the natural fibers are treated with one or more selected from the group consisting of:

sodium hydroxide, an enzyme selected from the group consisting of cellulase, hemicellulose, and ligninase, a biological agent selected from the group consisting of a fungal agent and a bacterial agent, a silane coupling agent, and a biopolymer-derived hydrophobic coating selected from the group consisting of a cutin-derived coating, a lipid-derived biopolymer coating, and a wax-ester biopolymer film;

wherein the polymer resin comprises at least one of a thermosetting resin, a thermoplastic polymer, and a bio-based thermosetting polymer; and wherein the fiber-polymer resin mixture is cured at a temperature between 40 and 120° C. and a pressure of from 0.2 to 1.5 MPa.

2. The method of claim 1, wherein the fiber-polymer resin mixture comprises a layered architecture of the bamboo fibers and the coconut fibers in a mass ratio between about 30:70 and about 70:30;

wherein the layered architecture comprises a cross-ply configuration having fiber layers oriented at 0° and 90°; and wherein each fiber layer has:

an areal density between about 200 and 1200 $g/m^2$, a ply thickness between about 0.2 and 1.5 mm, a fiber packing density between about 0.35 and about 0.65 $g/cm^3$, and a layer-to-layer misalignment not greater than about 5°.

3. The method of claim 1, wherein the natural fibers are treated with the fungal agent selected from the group consisting of *Trichoderma reesei, Phanerochaete chrysosporium*, and *Aspergillus niger;* wherein the fungal agent is applied at a culture concentration between $10^4$ and $10^8$ CFU/mL for about 10 to 100 hours at a temperature between 25° C. and 40° C.;

wherein the natural fibers, treated with the fungal agent, exhibit:

a lignin reduction between about 10 and 25 wt. %; and a surface roughness increase between about 10% and 60%, relative to the natural fibers without a surface treatment.

4. The method of claim 1, wherein the natural fibers are treated with the bacterial agent selected from the group consisting of *Enterobacter sichuanensis, Rhodococcus* species, *Pseudomonas putida, Cellulomonas* species, and *Bacillus* species;

wherein the bacterial agent is applied via incubation between about $10^5$ and $10^8$ CFU/mL for about 12 to 72 hours at a temperature between about 20° C. and 35° C.;

wherein the natural fibers, treated with the bacterial agent, exhibit:

a surface oxygen-to-carbon atomic ratio of the natural fibers between about 0.35 and 0.65;

a hemicellulose reduction between about 3 and 20 wt. % relative to the natural fibers without the surface treatment; and an increase in surface functional groups comprising hydroxyl, carboxyl, and carbonyl groups between about 5% and about 40% relative to relative to the natural fibers without the surface treatment.

5. The method of claim 1, wherein the natural fibers are treated with the silane coupling agent selected from the group consisting of 3-aminopropyltriethoxysilane (APS), 3-glycidyloxypropyltrimethoxysilane (GPTMS), vinyltrimethoxysilane (VTMS), and methyltrimethoxysilane (MTMS); and wherein the silane coupling agent is applied to the natural fibers at:

a concentration between about 0.5 and 3 wt. % relative to the total weight of the natural fibers;

a temperature between about 60° C. and 100° C. for about 15 to 120 minutes;

wherein the natural fibers, treated with the silane coupling agent, exhibit:

an increase in surface silicon content between about 0.5 and 5 wt. % relative to the total weight of the natural fibers without the surface treatment; and a reduction in interfacial void content between about 5% and 40% relative to the natural fibers without the surface treatment.

6. The method of claim 1, wherein the natural fibers are treated with the enzyme and exhibit:

a reduction in surface pectin content between about 5 and 30 wt. % relative to the natural fibers without the surface treatment;

an increase in fibrillation exposure between about 10% and 50% relative to the natural fibers without the surface treatment; and wherein the enzyme is contacted with the natural fibers in a solution having an enzyme activity between about 10 and 200 U/mL at a pH between about 4.5 and 6.5 for a duration between about 1 and 24 hours, and at a temperature between about 30° C. and 55° C.

7. The method of claim 1, wherein the polymer resin is the thermoplastic polymer selected from the group consisting of polypropylene (PP), polyethylene (PE), polyamide (PA6), polylactic acid (PLA), polybutylene succinate (PBS), and polyethylene terephthalate (PET).

8. The method of claim 1, wherein the polymer resin is the thermosetting resin selected from the group consisting of an epoxy resin, an unsaturated polyester resin, a phenolic resin, a polyurethane resin, a vinyl ester resin, and a melamine-formaldehyde resin; and wherein, during the curing, the thermosetting resin forms a crosslinked polymer network having a crosslink density between about $2\times10^{-4}$ and $1\times10^{-3}$ $mol/cm^3$.

9. The method of claim 1, wherein the polymer resin is the bio-based thermosetting polymer selected from the group consisting of itaconic-acid-based polyesters, mycelium-reinforced epoxy hybrids, polyhydroxyalkanoate-modified thermosets, soy-based epoxies, cardanol-based phenolic resins, and furfuryl-alcohol-derived furan resins; and wherein the bio-based thermosetting polymer exhibits a crosslink density between about $1\times10^{-4}$ and $8\times10^{-4}$ $mol/cm^3$.

10. The method of claim 1, wherein the natural fibers comprise the bamboo fibers and the coconut fibers in a mass ratio between about 30:70 and 70:30, based on the total weight of the natural fibers; and wherein the natural fibers have:

a tensile strength-to-impact energy absorption ratio between about 1.8 and 3.5, a fiber-packing efficiency between about 0.35 and 0.65 $g/cm^3$, and a hybrid-synergy index between about 1.1 and 1.4.

11. A fiber-reinforced polymer composite obtained by the method of claim 1, having:

a tensile strength between about 180 and 280 MPa as measured in accordance with ASTM D3039, and a flexural strength between about 220 and 320 MPa as measured in accordance with ASTM D790.

12. The fiber-reinforced polymer composite of claim 11, having:

a tensile modulus between about 10 and 22 GPa as measured in accordance with ASTM D3039, and a flexural modulus between about 8 and 18 GPa as measured in accordance with ASTM D790.

13. The fiber-reinforced polymer composite of claim 11, having:

an interlaminar shear strength between about 12 and 28 MPa as measured in accordance with ASTM D2344, and an interlaminar fracture toughness between about 400 and 1000 J/$m^2$ as measured in accordance with ASTM D5528.

14. The fiber-reinforced polymer composite of claim 11 has:

between about 75% and 90% of the tensile strength after 500 hours in about 3 to 5 wt. % NaCl, between about 75% and 90% of the flexural strength after 500 hours at a pH of about 3 to 12, and between about 75% and 85% of the tensile and flexural strengths after immersion for 28 days in an aqueous solution selected from the group consisting of 5 wt. % hydrochloric acid, 5 wt. % sodium hydroxide, and 5 wt. % sodium chloride, as measured in accordance with ASTM D570.

15. The fiber-reinforced polymer composite of claim 11, having:

a 24-hour water absorption not greater than about 3 wt %, and a 7-day water absorption not greater than about 6 wt %.

16. The fiber-reinforced polymer composite of claim 11, having:

a swelling thickness between about 0.5% and 1.0% after 24 hours of water immersion, the swelling thickness between about 1.0% and 1.5% at a full-saturation water uptake, and the swelling thickness not greater than about 4% after 7 days of water immersion.

17. The fiber-reinforced polymer composite of claim 11, having:

a glass-transition temperature between about 80° C. and 180° C., and a thermal-degradation onset temperature of at least about 280° C.

18. The fiber-reinforced polymer composite of claim 11, having:

a storage modulus between about 2 and 6 GPa at 25° C. as measured in accordance with ASTM D4065, and the storage modulus of about 0.8 to 3.0 GPa at a temperature between about 75° C. and 100° C. as measured in accordance with ASTM D7028.

19. The fiber-reinforced polymer composite of claim 11, having:

a fatigue life of at least about $10^5$ cycles at a stress amplitude of 40% to 50% of the tensile strength between about 180 and 280 MPa, and an impact strength between about 35 and 80 kJ/$m^2$ as measured in accordance with ASTM D256.

20. The fiber-reinforced polymer composite of claim 11, having:

a limiting oxygen index of at least about 26%, and a thermal conductivity between about 0.08 and 0.18 W/(m·K) as measured in accordance with ASTM E1530.

* * * * *